United States Patent

Gao et al.

[11] Patent Number: 5,832,445
[45] Date of Patent: Nov. 3, 1998

[54] METHOD AND APPARATUS FOR DECODING OF DIGITAL AUDIO DATA CODED IN LAYER 1 OR 2 OF MPEG FORMAT

[75] Inventors: Fei Gao, Hannover; Thomas Oberthür, Laatzen; Mathias Tilmann, Hannover, all of Germany

[73] Assignee: Sican GmbH, Hannover, Germany

[21] Appl. No.: 621,764

[22] Filed: Mar. 22, 1996

[30] Foreign Application Priority Data

Mar. 23, 1995 [DE] Germany .......................... 195 10 226.6
Apr. 28, 1995 [DE] Germany .......................... 195 15 612.9

[51] Int. Cl.$^6$ ................................. G10L 3/02; H04B 1/66
[52] U.S. Cl. ........................... 704/501; 704/203; 704/500
[58] Field of Search .................................. 395/2.12, 2.92; 704/203, 500, 501

[56] References Cited

PUBLICATIONS

Witte, et al., Multipurpose Audio Signal Compander, *IEEE Transactions on Consumer Electronics* 39:3, 260–268, Aug. 1993.
Witte, et al., Single Chip Implementation of an IOS/MPEG Layer III Decoder, *Audio Engineering Society*, Feb. 26, 1994.
Multi standard Audio Decoder DAC, *Crystal Cemiconductor Corp.,* Prior to 1995.
Maturi, Dekompression, *Elrad,* 1994 Hett 1, 64–66 (with English–language translation).
Maturi, G., Single Chip MPEG Audio Decoder,IEEE Trans. Consumer Electr., vol. 38, No. 3, pp. 348, Aug. 1992.

*Primary Examiner*—David R. Hudspeth
*Assistant Examiner*—Robert Louis Sax
*Attorney, Agent, or Firm*—Stephen M. Knauer; Flehr Hohbach Test Albritton & Herbert LLP

[57] ABSTRACT

A method and apparatus for the decoding of digital audio data encoded in accordance with layer 1 or 2 of the MPEG format. The inverse quantization of the quantizised data samples and the resealing of the inverse quantizised data samples takes place contemporaneously with windowing of the data samples transformed into the time domain and not contemporaneously with transformation of data samples from the frequency domain into the time domain using a matrix operation. The apparatus has fixed-wire frame unpacking and filter bank units. The frame unpacking unit is used for frame synchronization of a data stream, header decoding, reading of page information, inverse quantization of quantizised subband data samples and resealing of the inverse quantizised data samples. The filter bank unit is used for transformation of rescaled data samples from the frequency domain into the time domain using a matrix operation and for windowing of the data transformed into the time domain.

10 Claims, 21 Drawing Sheets

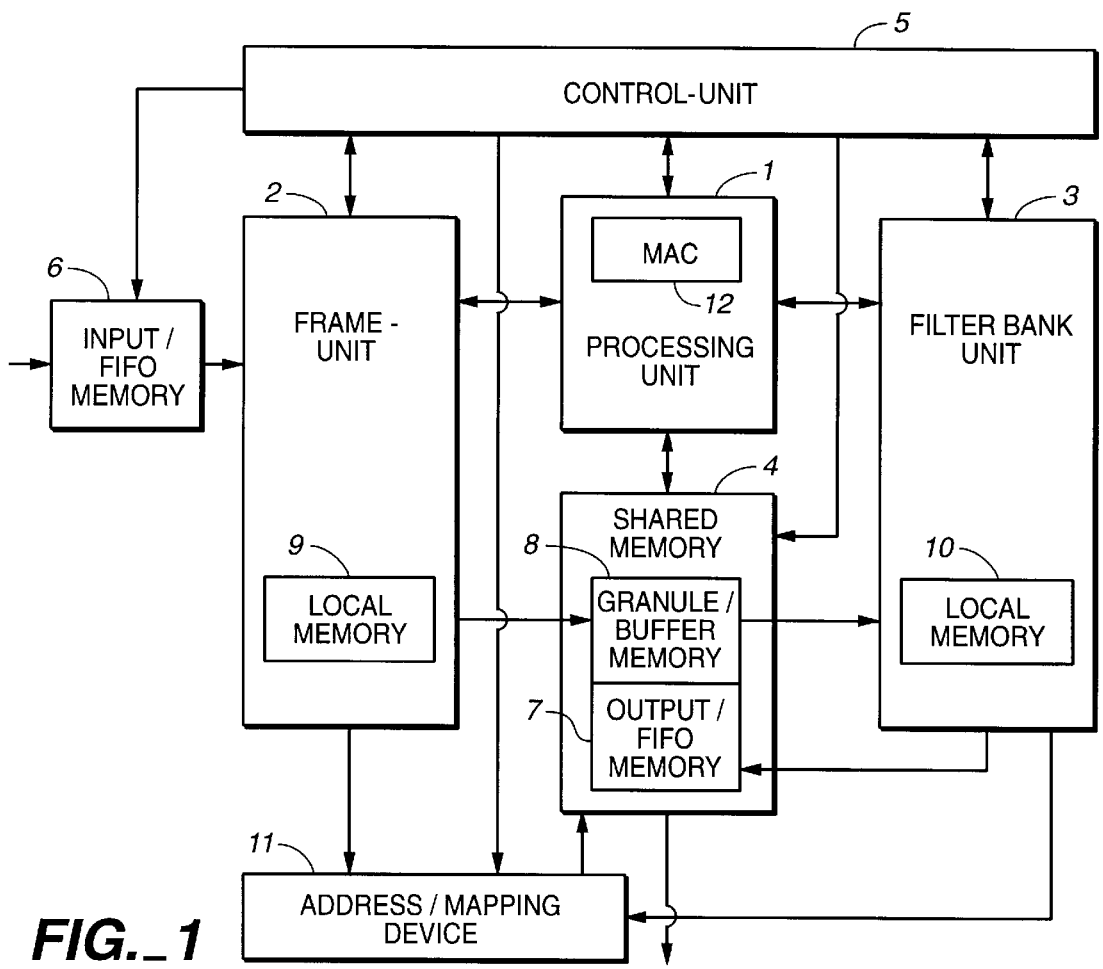
FIG._1
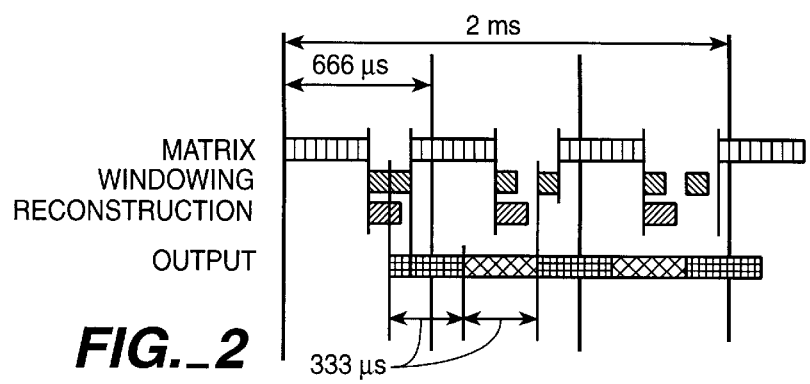
FIG._2

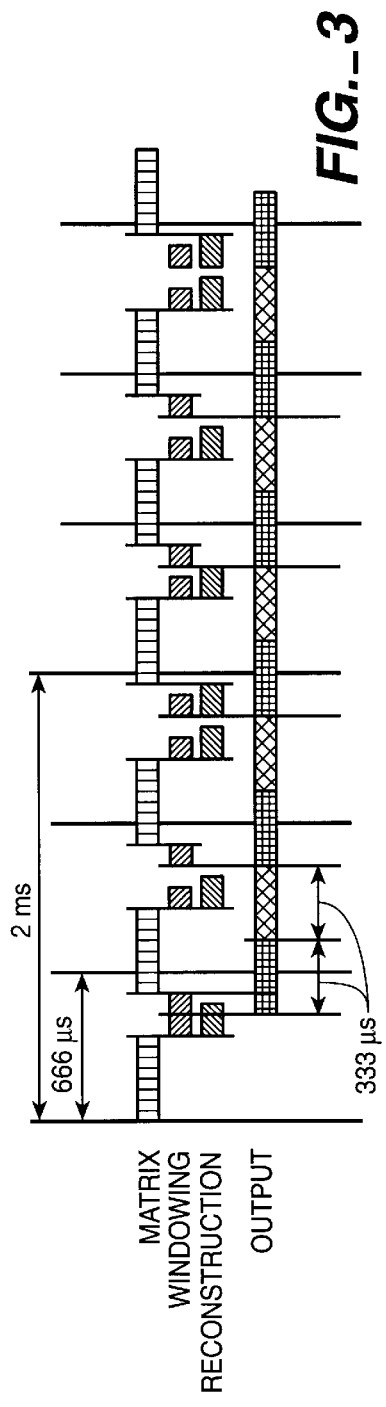
FIG._3
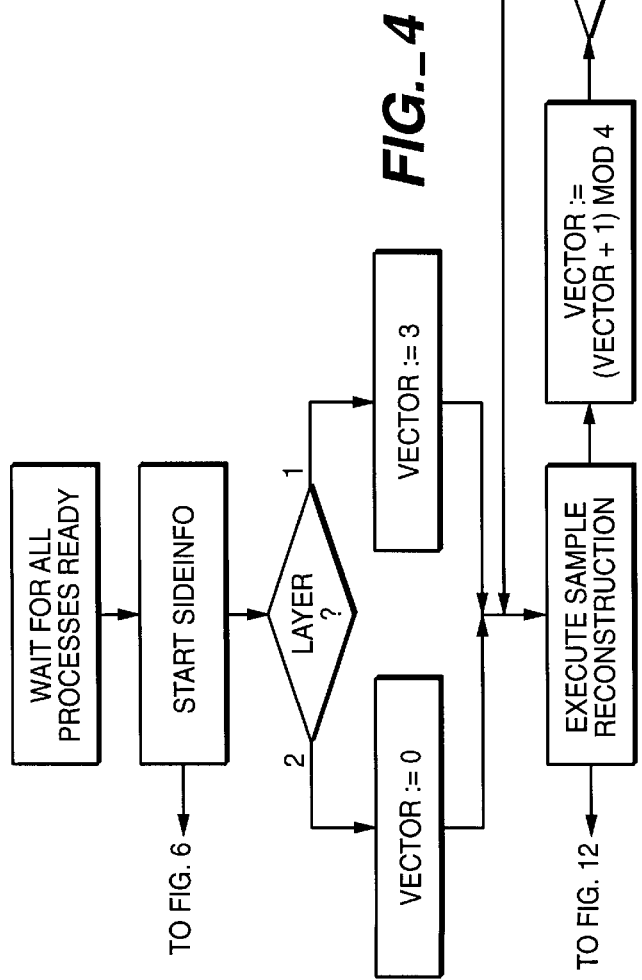
FIG._4

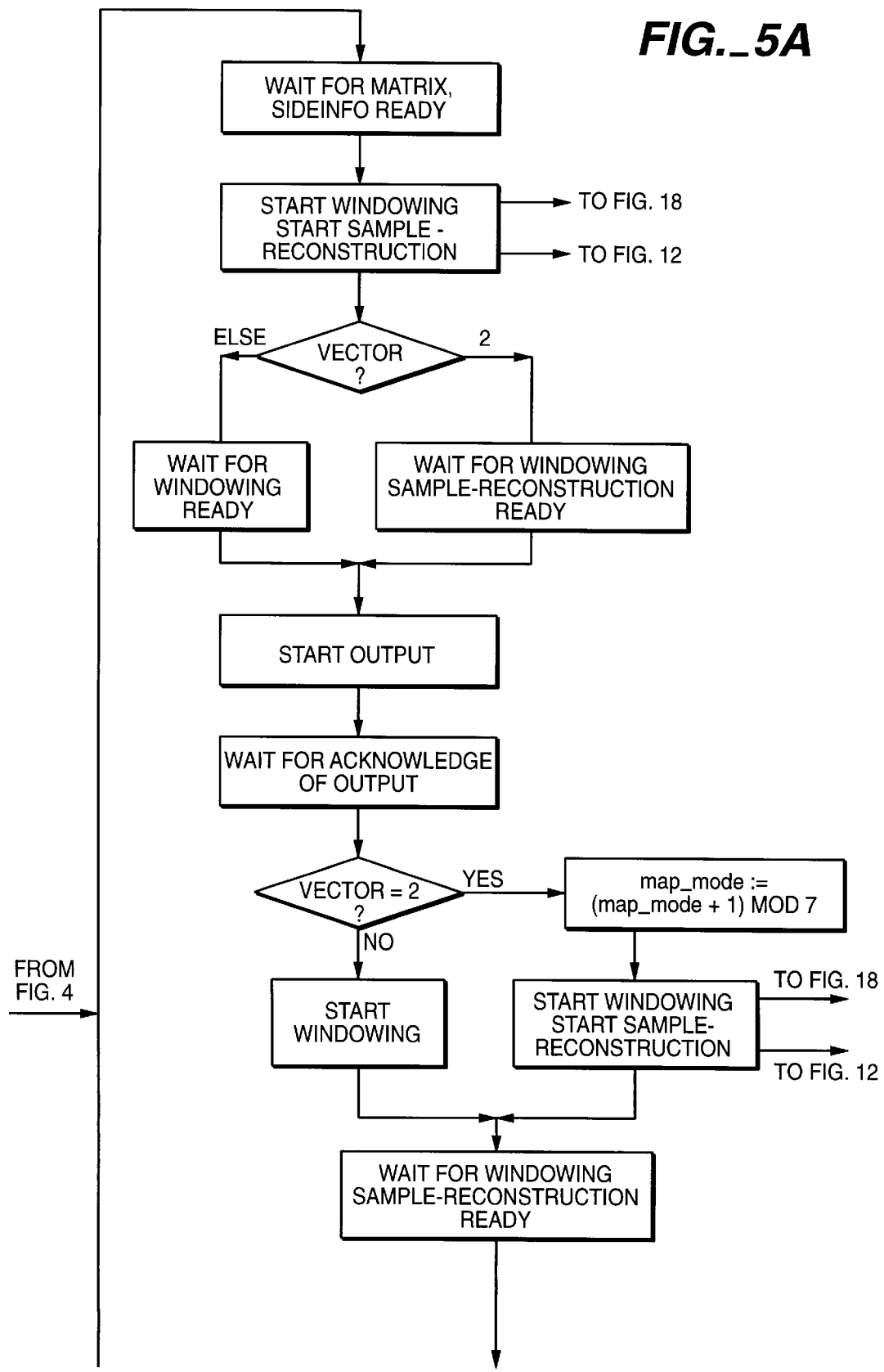
FIG._5A

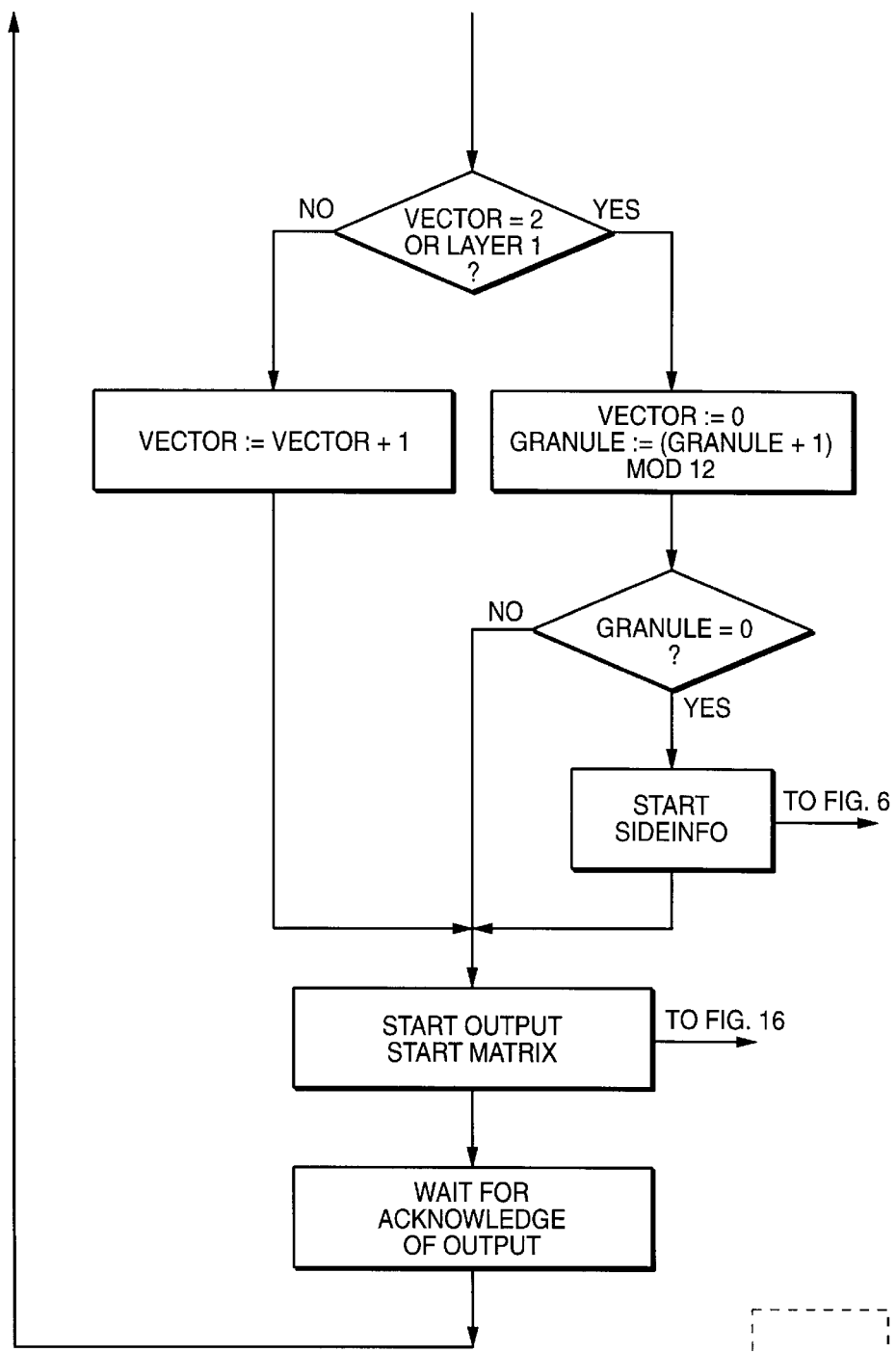
FIG._5B
FIG._5   FIG._5A / FIG._5B

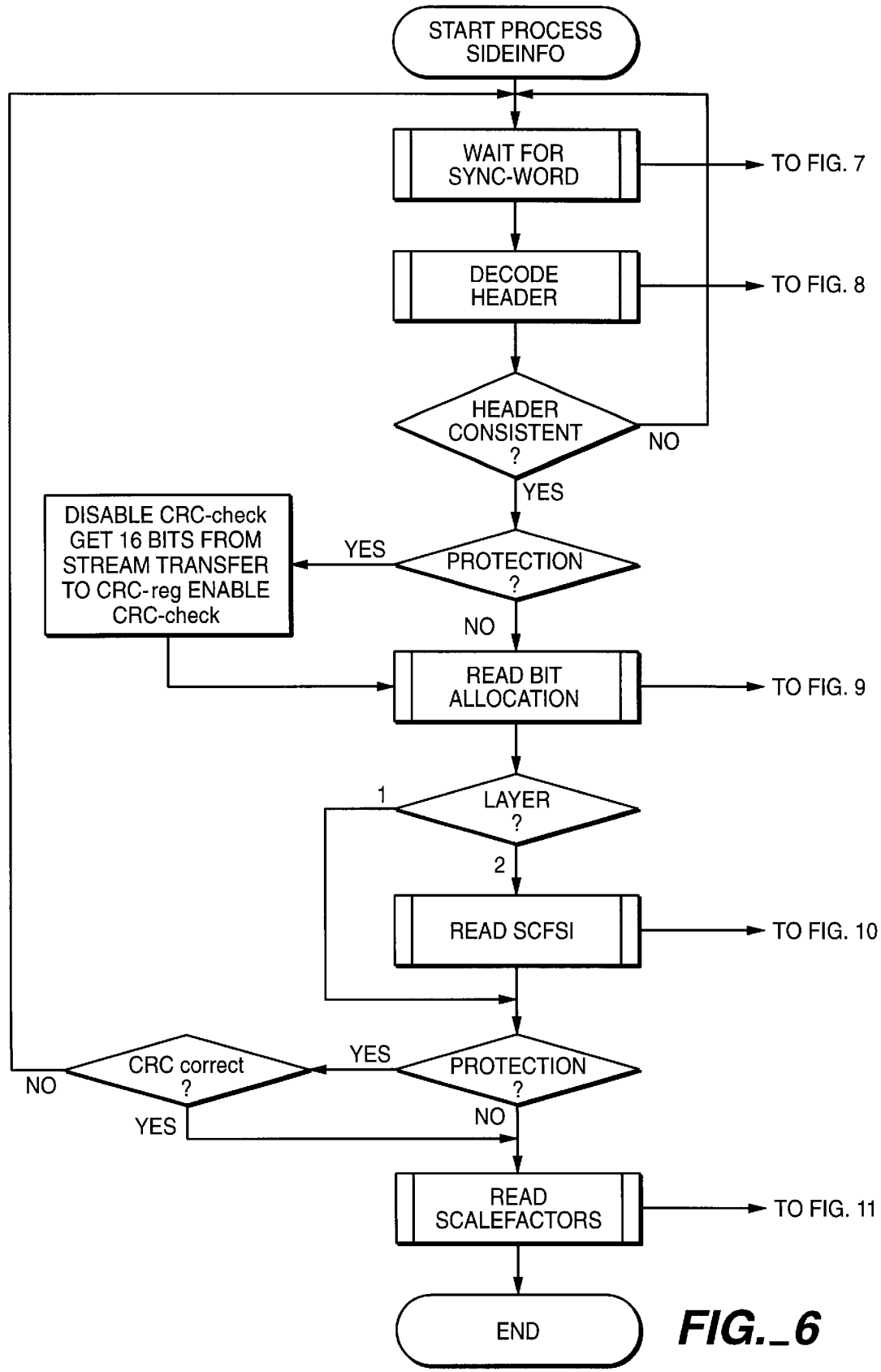
FIG._6

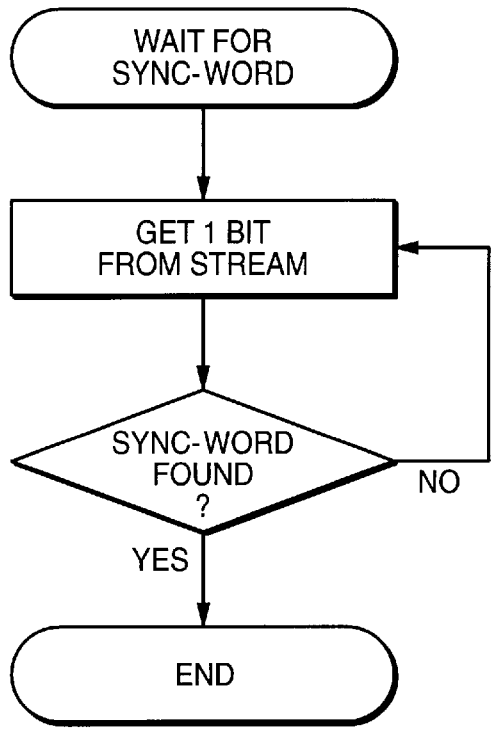
FIG._7
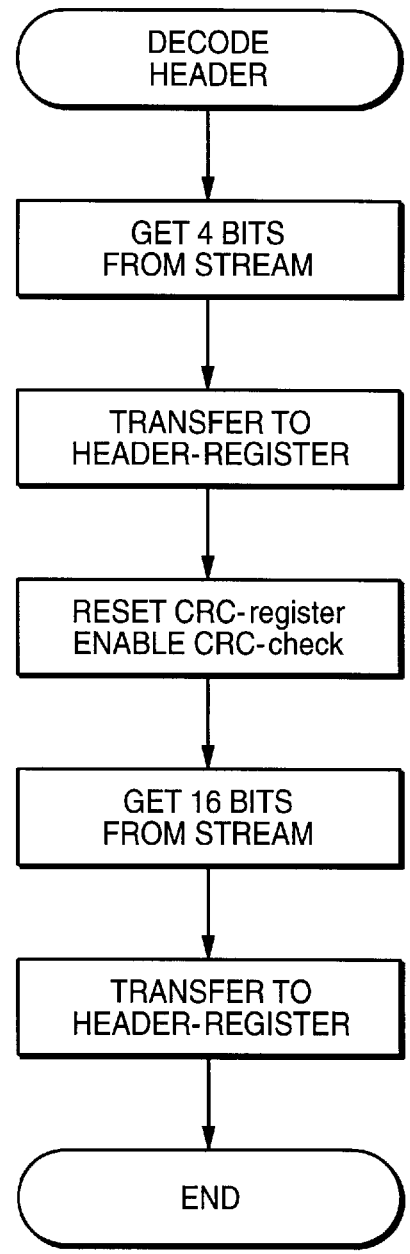
FIG._8

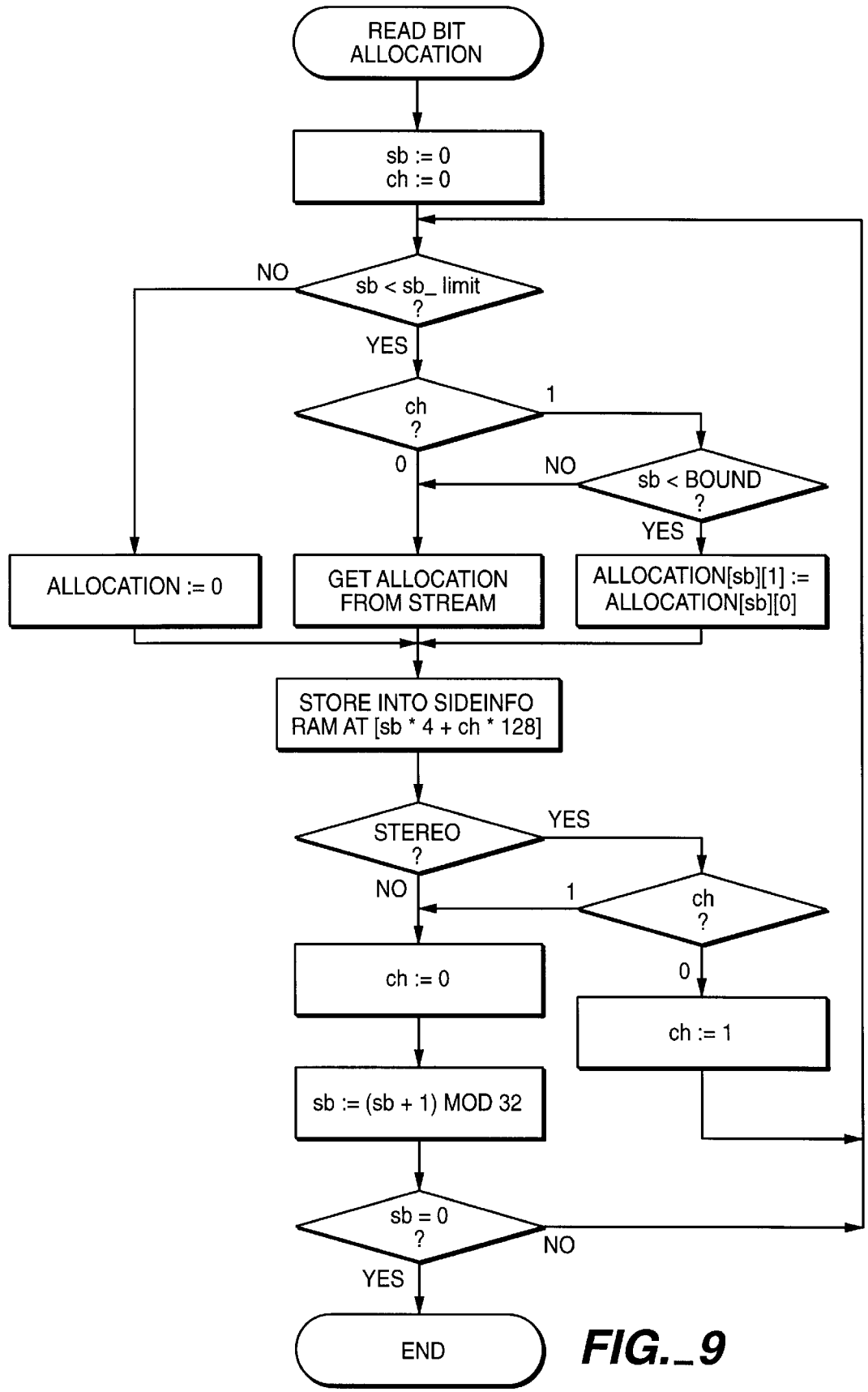
FIG._9

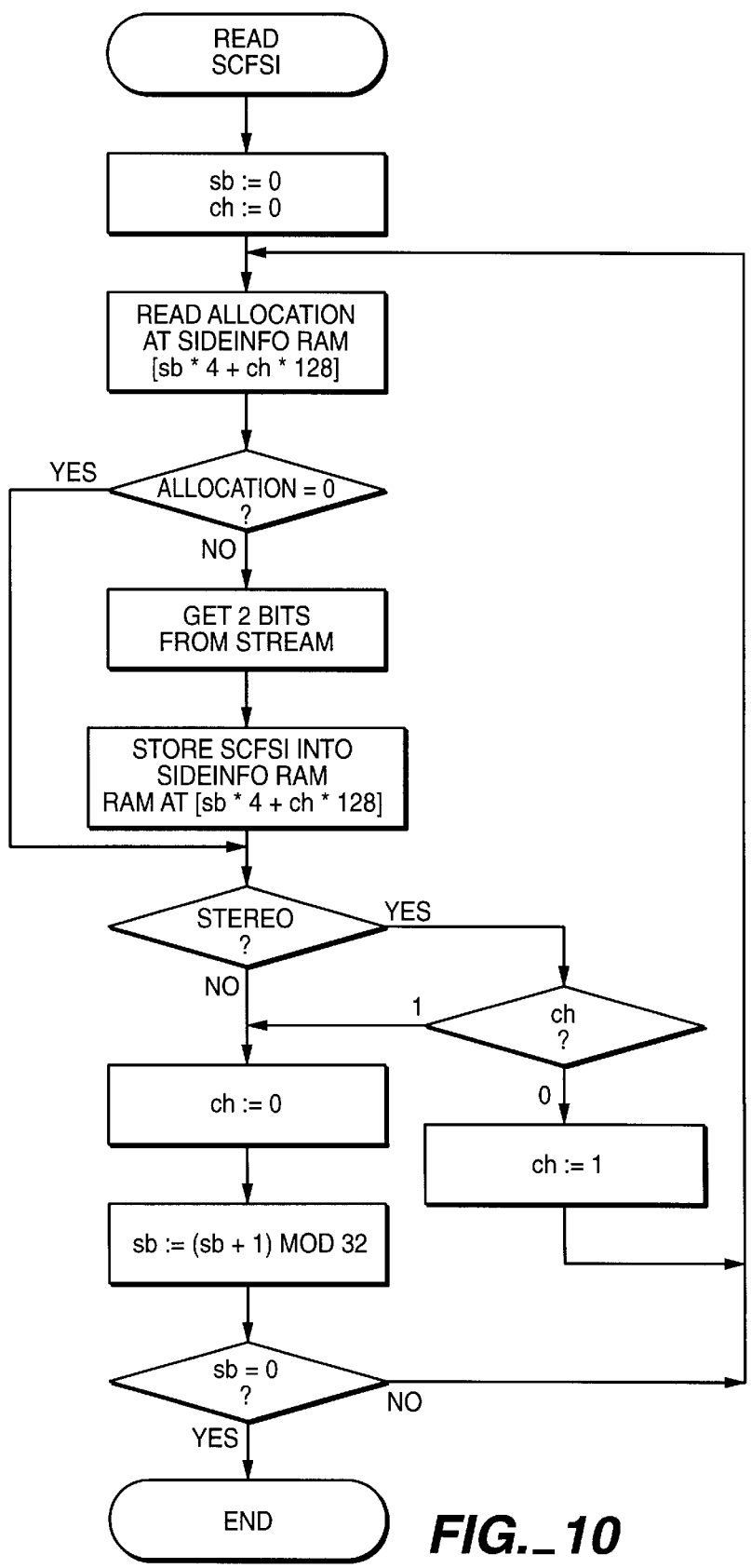
FIG._10

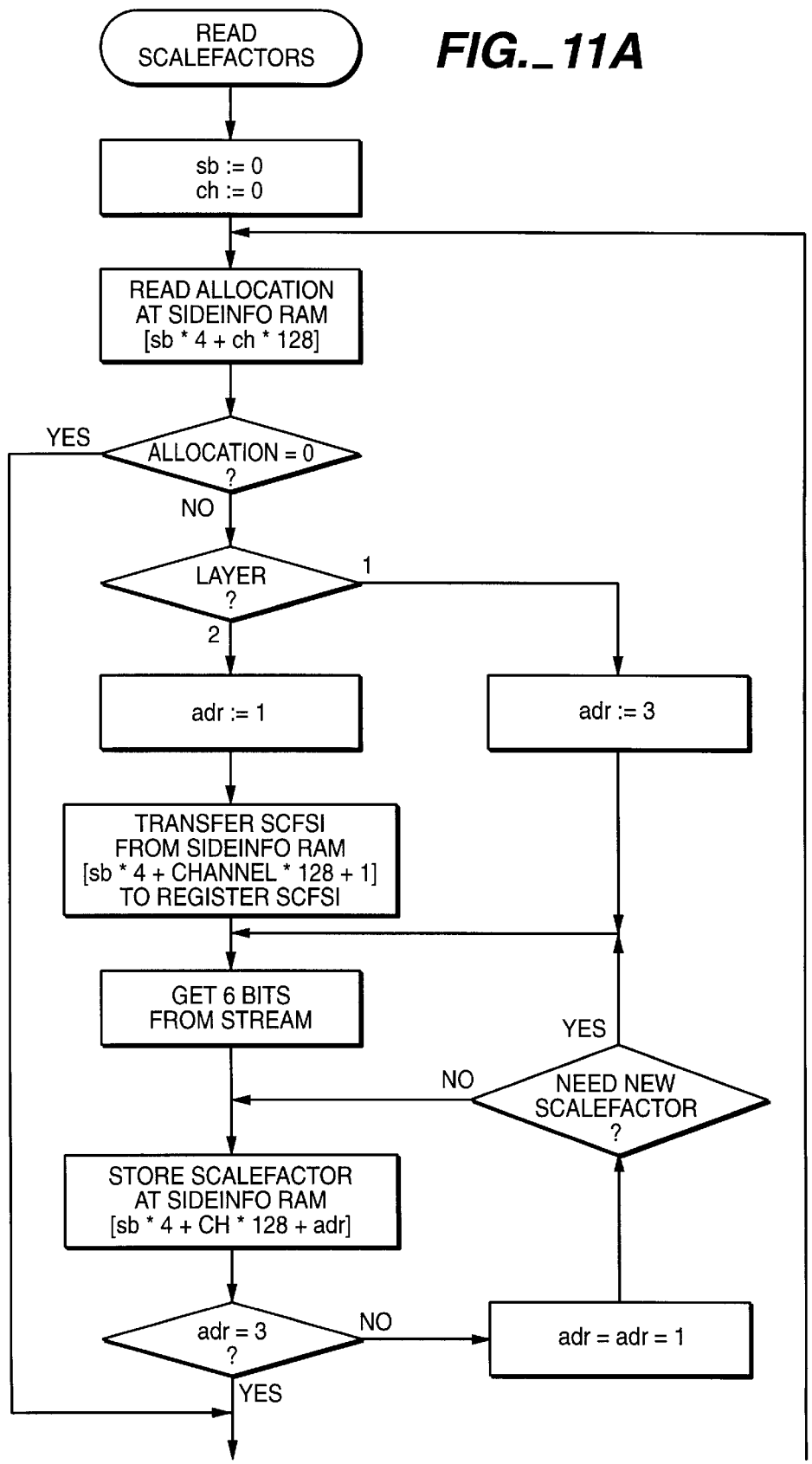
FIG._11A

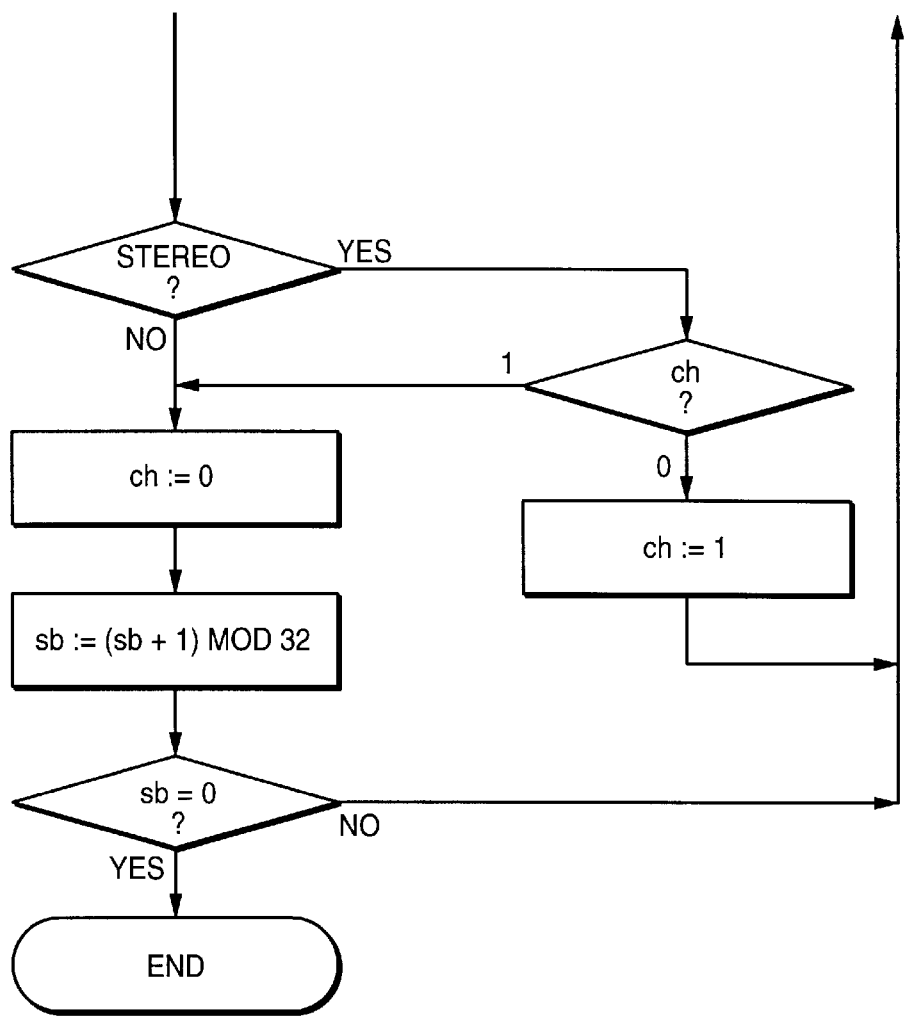
FIG._11B
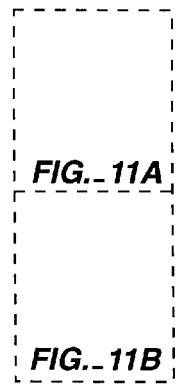
FIG._11

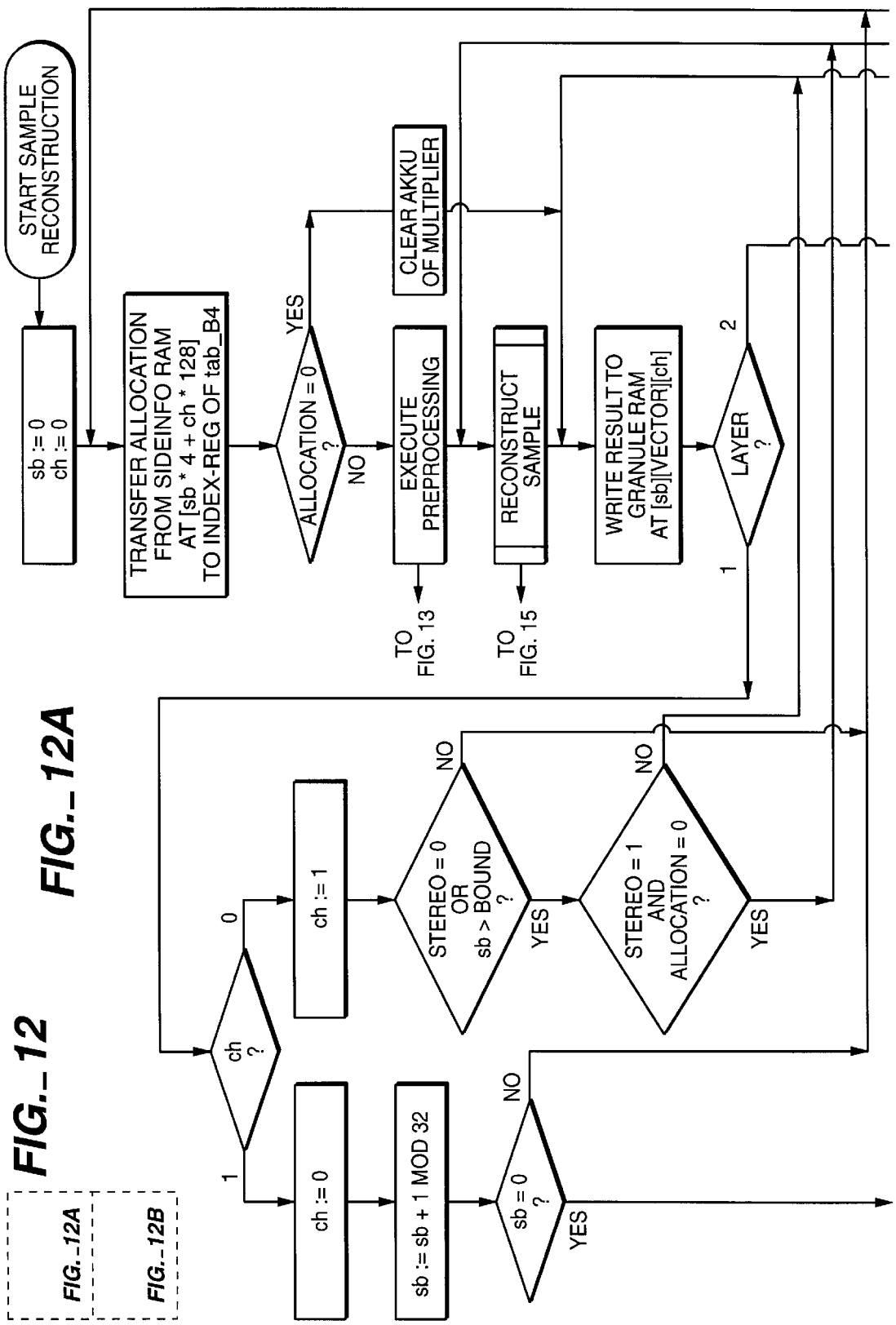

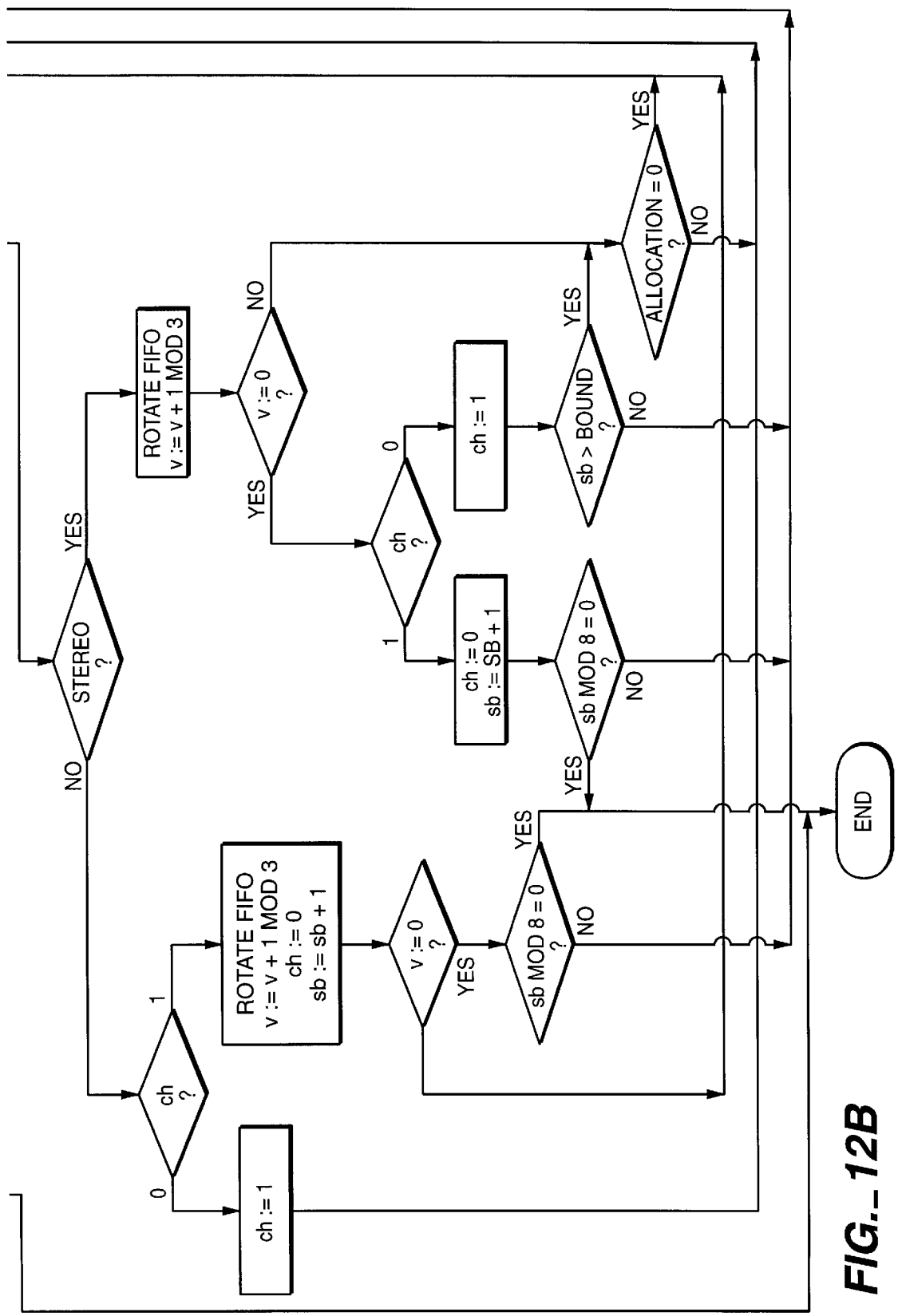
FIG._12B

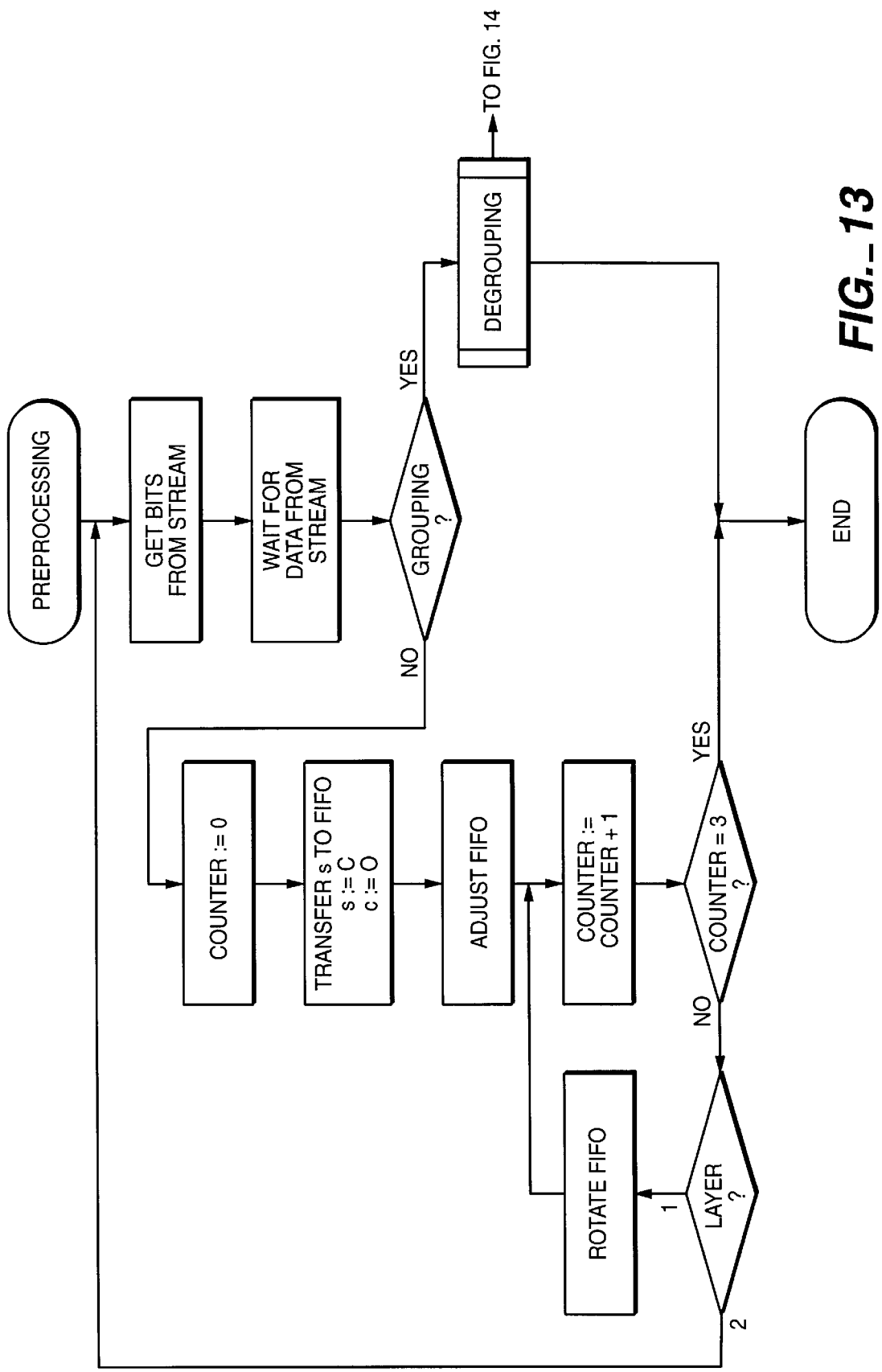
FIG._13

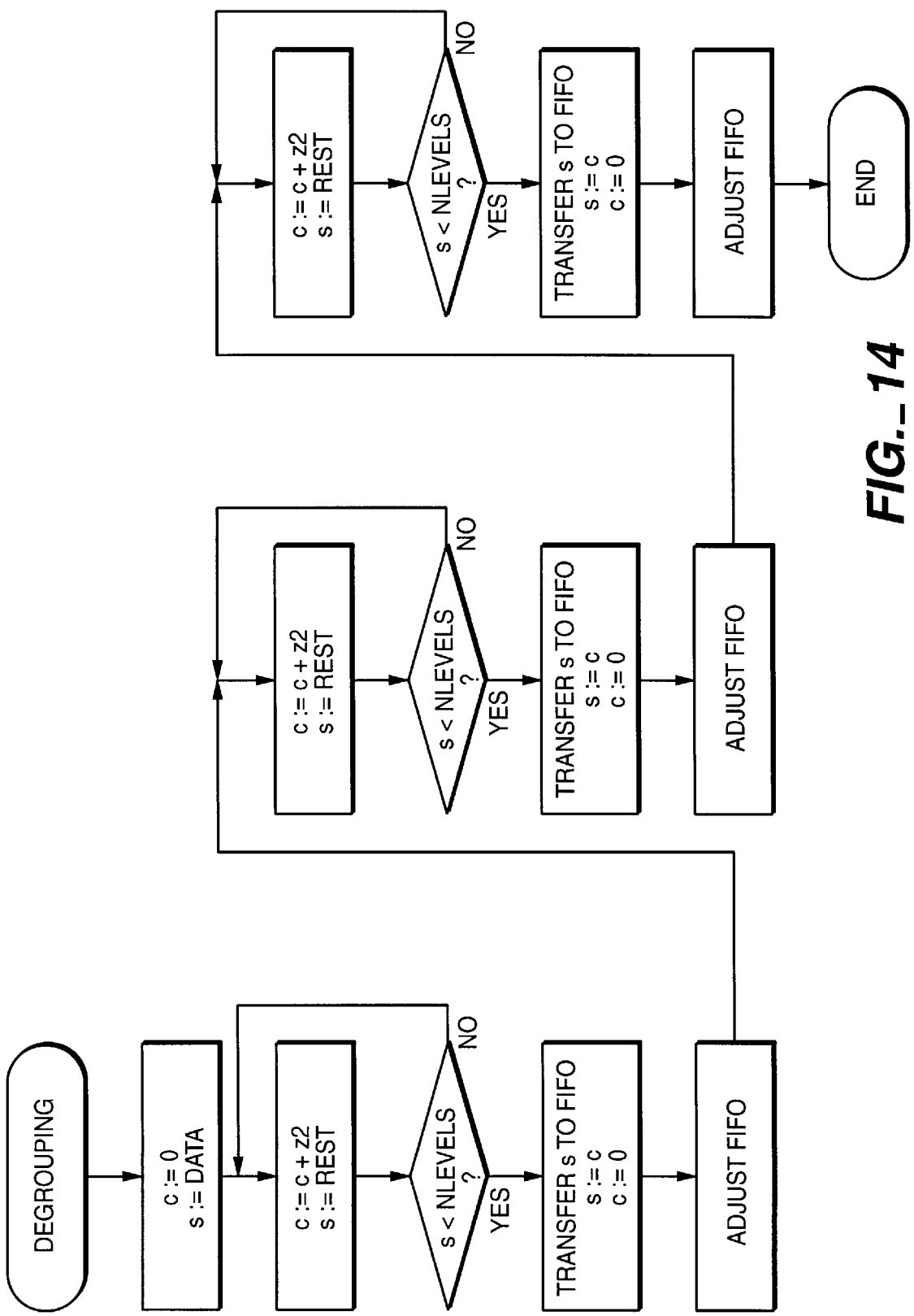
FIG._14

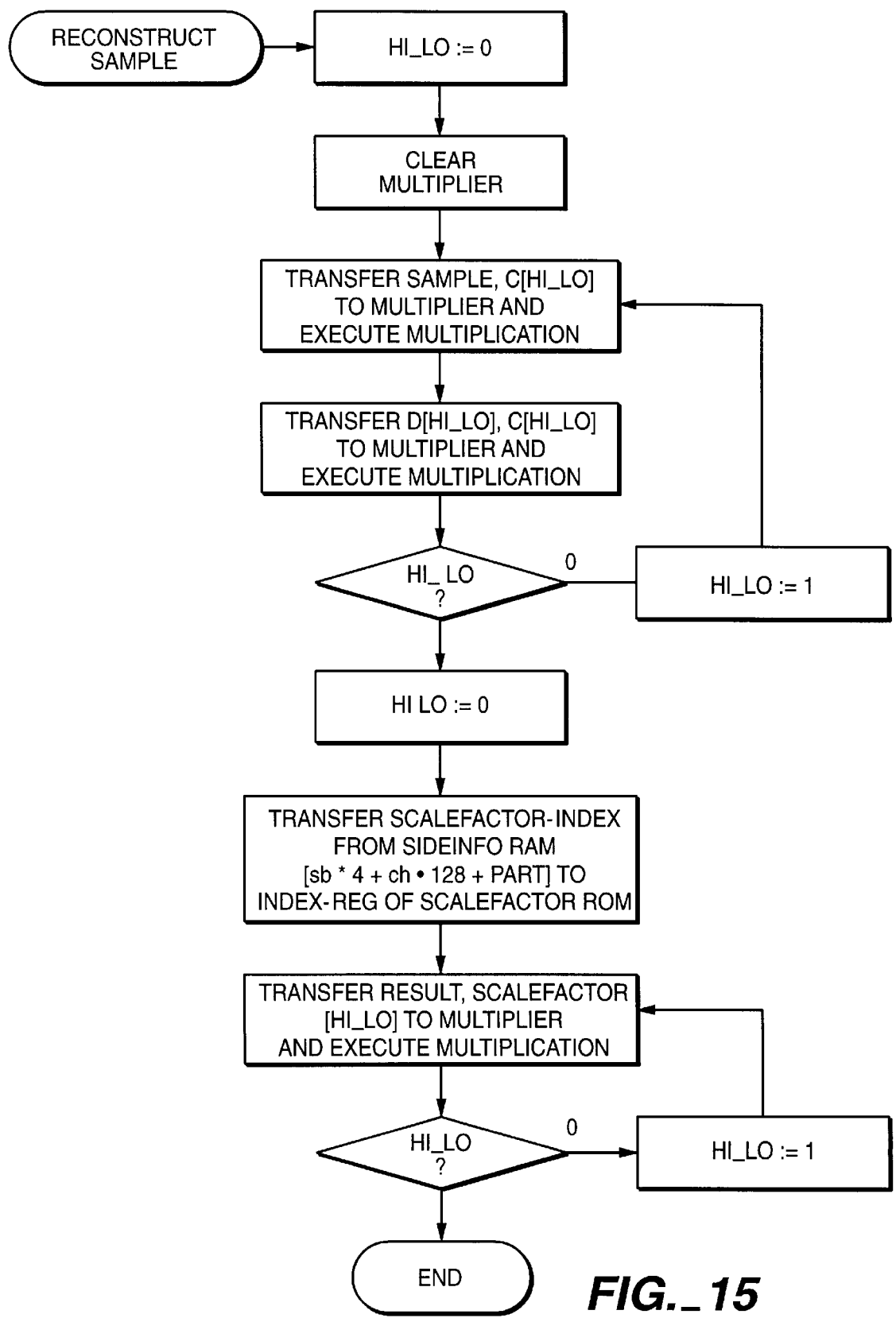
FIG._15

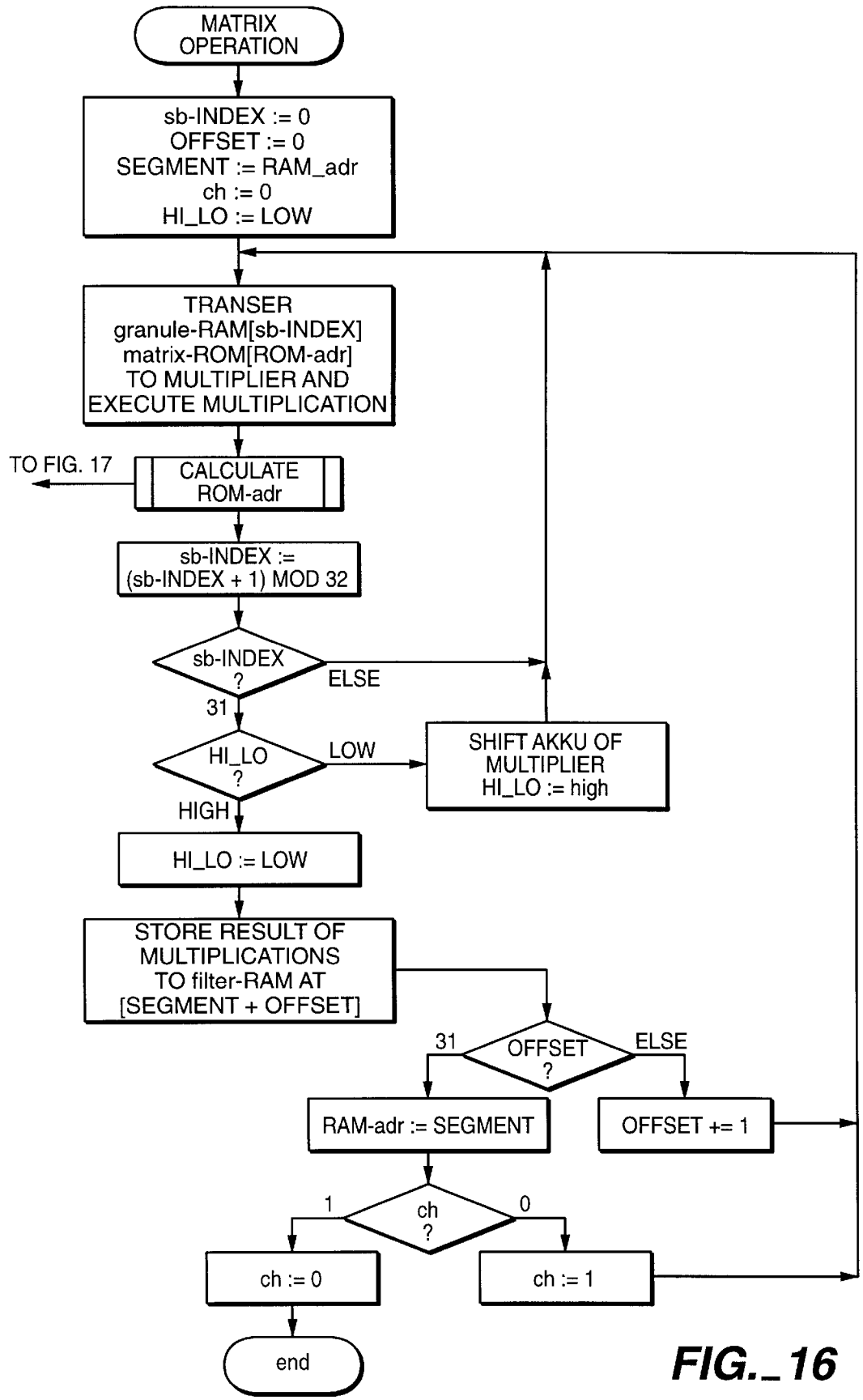
FIG._16

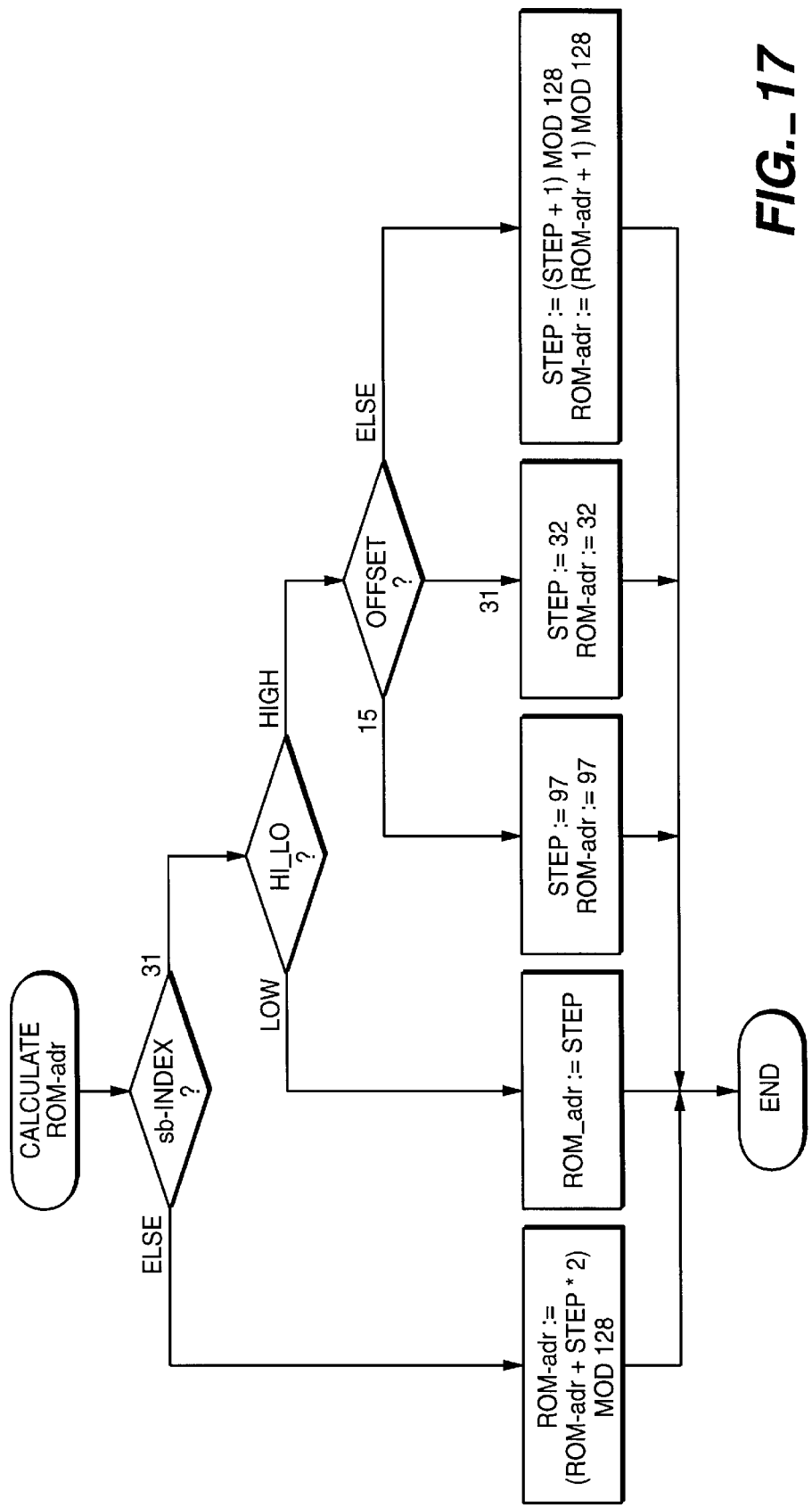
FIG._17

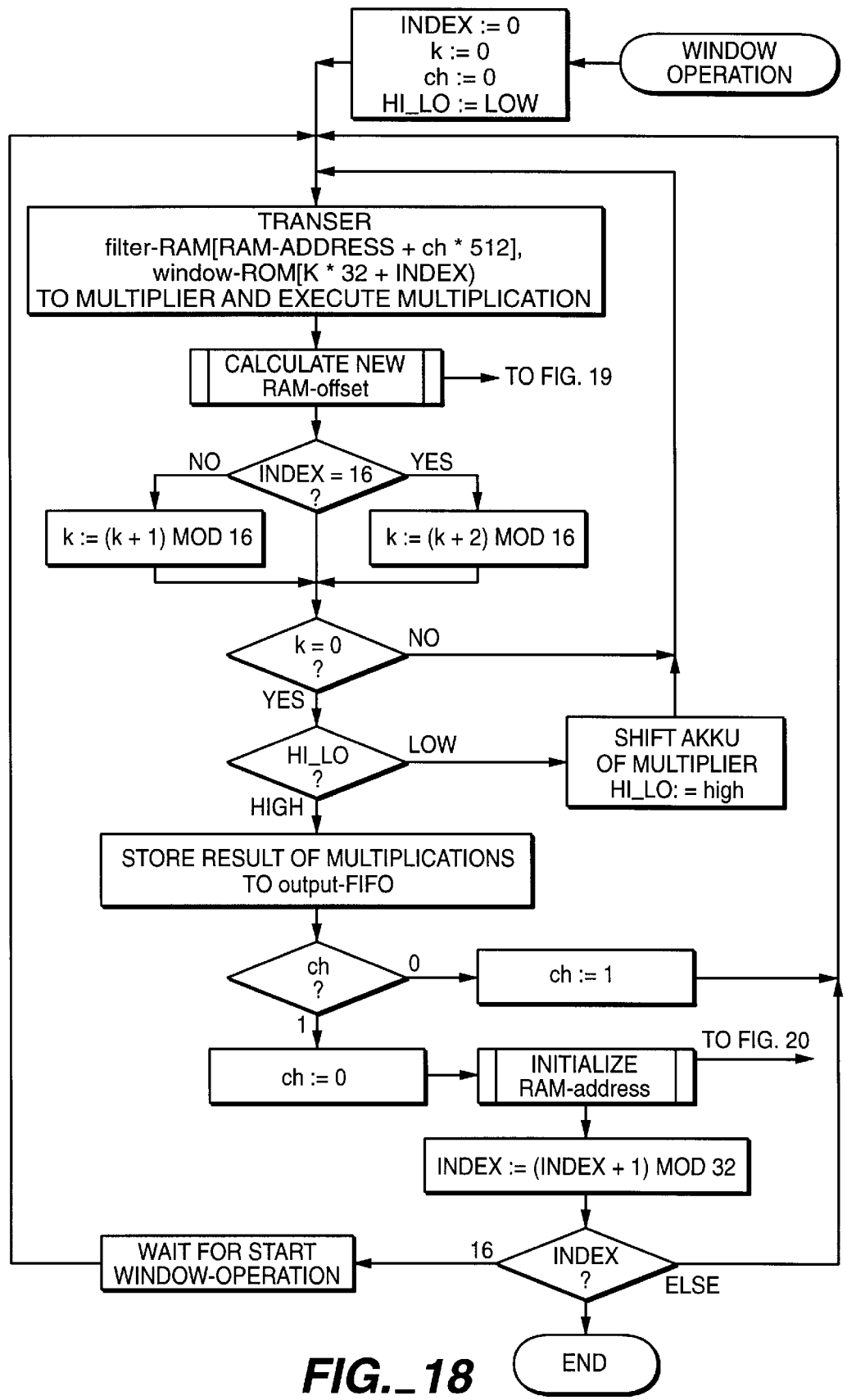
FIG._18

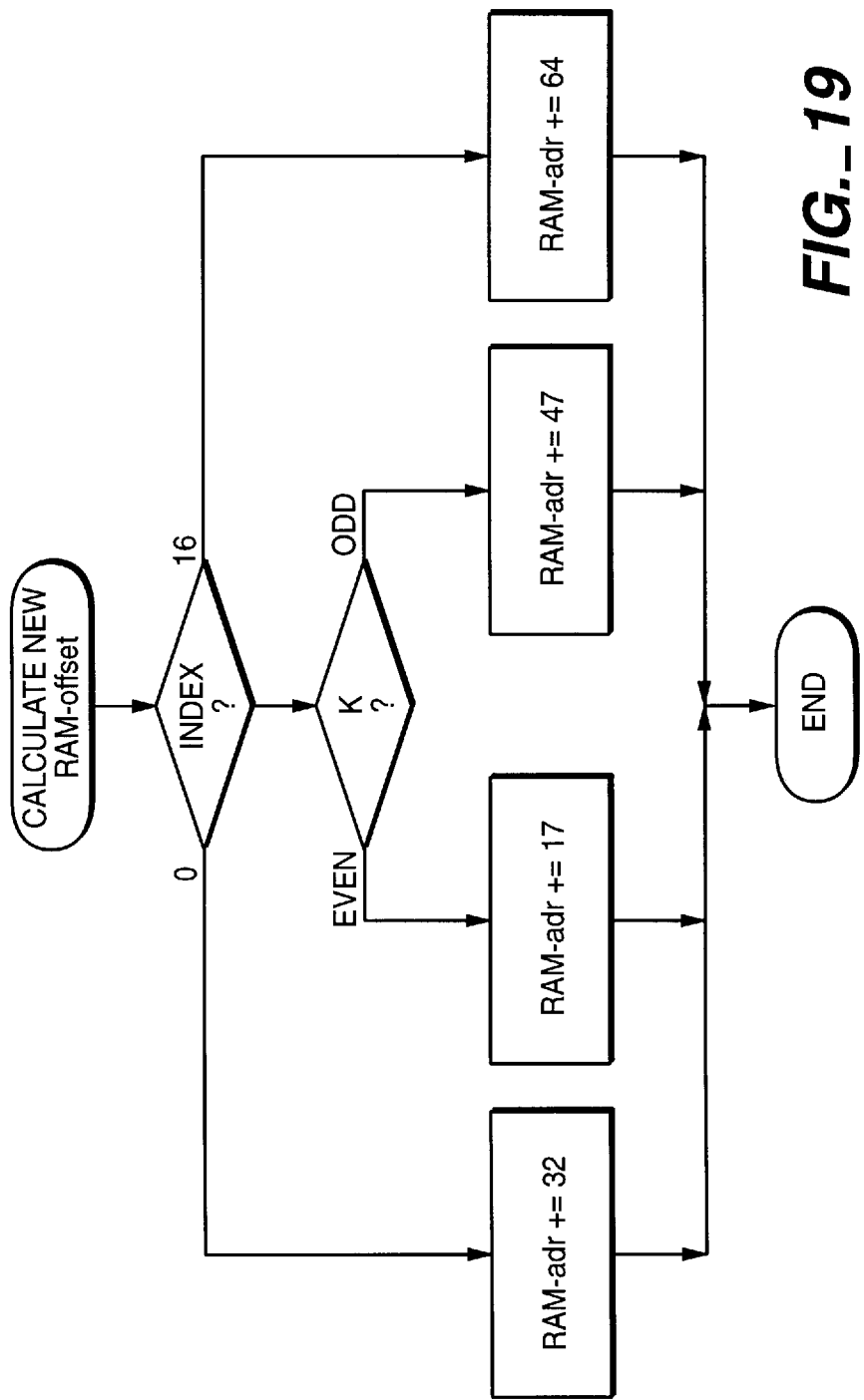

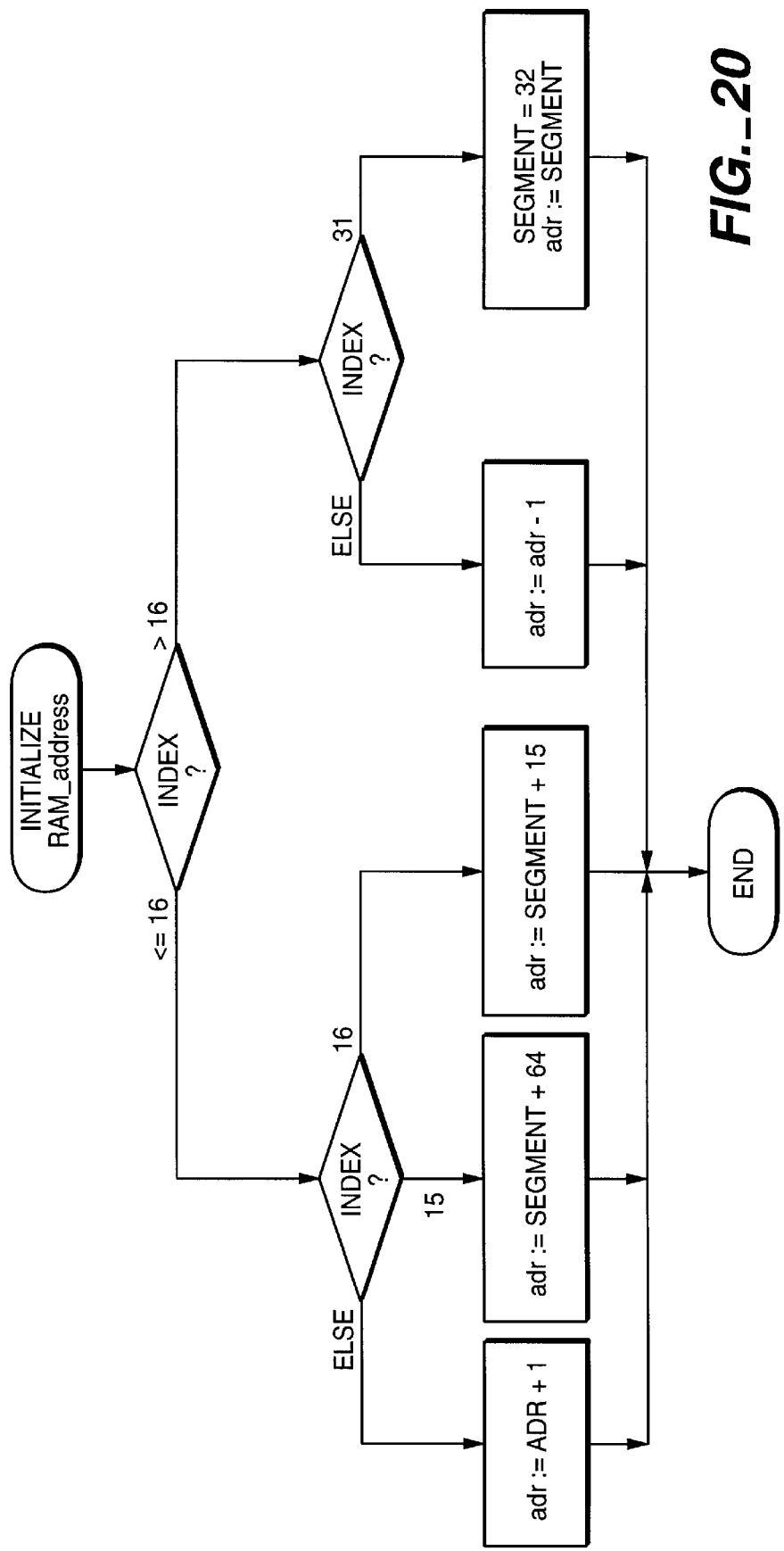
FIG._20

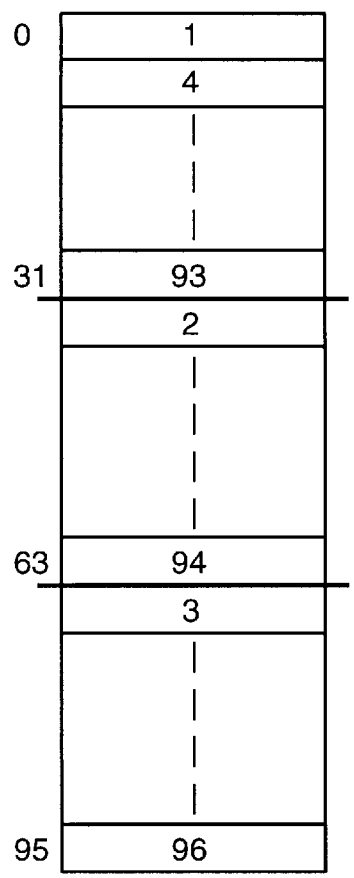
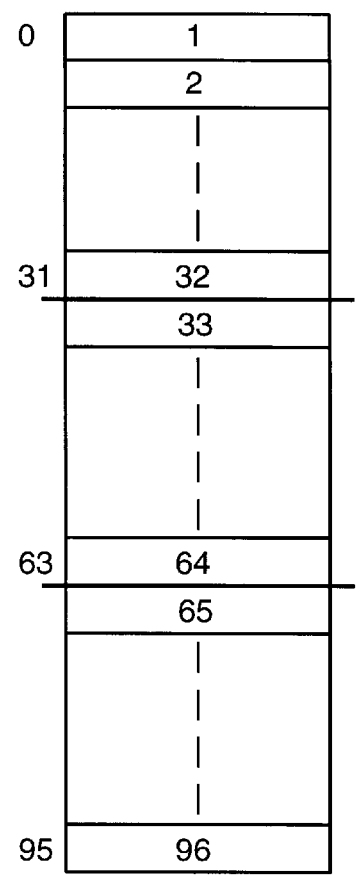
ORDER OF WRITING
RECONSTRUCTED
SAMPLES
(3 SAMPLES PER
SUBBAND OF GRANULE)
ORDER OF READING
RECONSTRUCTED
SAMPLES
(32 SAMPLES PER
GROUP OF GRANULE)
FIG._21
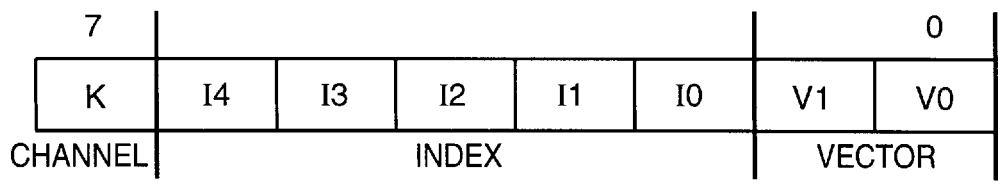
FIG._22

METHOD AND APPARATUS FOR DECODING OF DIGITAL AUDIO DATA CODED IN LAYER 1 OR 2 OF MPEG FORMAT

BACKGROUND OF THE INVENTION

In the ISO/IEC 11172 MPEG standard, data reduction processes are defined both for video and for audio data. This standard is titled "Information technology—coding of moving pictures and associated audio for digital storage media at up to 1.5 Mbit/s". In this standard, various algorithms for the compression of video and audio data are defined and a concept for the synchronization of video and audio within a data stream is proposed.

In part 3, pages 15 to 17 of the ISO/IEC 11172 MPEG standard, three different layers are defined for audio data using data compression algorithms having different complexity. According to their complexity, the algorithms are designated as layer 1, layer 2 and layer 3. A layer x Decoder has to decode layer x as well as every layer x−n (n<x, with x=1,2 or 3). Only the format of the data stream is described by the standard, so that only the decoder is specified. On the other hand, the design of the encoder isn't defined so that improvements to the encoder in quality are impossible without charging the decoder.

Layer 1 and 2 algorithms are based on a common principle of the encoder. For data compression with either algorithm, the reduction of redundance as well as the reduction of irrelevance is used. Thus, in general, the decoded signal can not completely be reconstructed.

The encoding steps of layer 1 and 2 are as follows:

1) Using a polyphase filter bank, the signal is transformed from the time domain into the frequency domain. The resolution amounts to 1/32 of the band width of the original signal. This way 32 subbands arise which have a constant width depending on the sampling frequency. The data samples of each subband are divided into three sets of 12 data samples and are commonly processed. A scale factor is defined for each set using the maximum value of the 12 data samples and all of the data samples in the set are scaled using the scale factor. An increased dynamic is facilitated by the method of block compression using an increased modulation of the following quantiziser which has an equal number of quantiziser steps.

2) In parallel to the polyphase filter bank, the audio signal is analyzed using a psyco acoustical model. Thereby, it is determined which parts of the signal can't be perceived with human ears. For each subband, a masking threshold is calculated out of this information. To keep the disturbances of quantizising below the masking threshold and therefore inaudible, the number of the quantiziser steps is defined by the distance between a maximum signal level in a subband and the masking threshold.

3) The scaled samples are quantisised with the help of the quantiziser using control information from the psyco acoustical model.

4) At the end, assembling of a frame of an audio data stream takes place consisting of a header, page information required by the decoder, and quantisised subband samples.

The framework of a data stream according to the MPEG audio layer x (x<3) consists of a synchronization word (Sync), a header, an optional CRC test sum, page information, quantisised subband samples, and optional additional information. In the page information, the bit allocation table and the information about scale factors are contained.

In layer 1, the bit allocation table is ascertained by the psycho acoustic model. There, the number of bits used for quantizising of each subband to be quantisised is stated. Each value of the bit allocation table has a width of four bits so that the accuracy of quantizising ranges between 0 and 15 bits. A bit allocation of 0 bits means that no information will be transmitted for the corresponding subband.

In layer 1, the page information consists of a complete bit allocation table as well as scale factors for each set. However the scale factors are transmitted only for those subbands whose bits are allocated.

TABLE 1

Construction of a frame in layer 1 format

| Range | Number of Bits |
|---|---|
| Sync: | 12 bits |
| Header: | 20 bits |
| CRC | 16 bits (optional) |
| Bit Allocation | 4 bits for each subband and each channel mono: 128 bits stereo: 256 bits |
| Scale Factors | 6 bits for each subband to be transmitted maximum: 6 bits * 32 subbands * 2 channels = 384 bits |
| Samples | 2 to 15 bits per sample |
| Additional Information | length not specific (optional) |

Layer 2 is distinguishable from layer 1 by an increased frame length and a more efficient coding of the page information so that it has an increased quality having a higher rate of compression. The bit allocation tables in layer 2 isn't constructed for all of the 32 subbands and is limited to a determined number of subbands depending on the bit rate and mode. Additionally, the values stored in the bit allocation table don't directly indicate the quantization width, but they are an index to one of the four bit allocation tables in which these numbers are stored. In encoding the indices, 2, 3 or 4 bits are used for different frequency ranges.

In layer 2, 1152 (=3*384) PCM data samples are processed within a frame. From these data samples, 36 data samples for each subband result after filtering with these data samples divided into three sets of 12 data samples. For each set, a scale factor is defined. In stationary signals, the three scale factors of a subband don't differ or differ only negligibly from another. Thus, the data transfer rate for the scale factors can be reduced by transmitting only once the scale factors of a subband that are equal. The information about which scale factors of a subband are contained in the data stream is stated in the select information of the scale factor (SCFSI). Therefore, four different patterns of the scale factors are encoded using 2 bits and are stated for each used subband.

TABLE 2

Construction of a frame in layer 2 format

| Range | Number of Bits |
|---|---|
| Sync: | 21 bits |
| Header: | 20 bits |
| CRC | 16 bits (optional) |
| Bit Allocation | 2, 3 or 4 bits per subband and channel maximum 94 * 2 bits = 188 bits |
| SCFSI | select information of the scale factor 2 bits per applied subband maximum 2 bits * 30 subbands * 2 channels = 120 bits |

TABLE 2-continued

Construction of a frame in layer 2 format

| Range | Number of Bits |
|---|---|
| Scale Factors | 6 bits for each subband to be transmitted maximum: 6 bits * 30 subbands * 2 channels = 360 bits |
| Samples Information | length not specified (optional) |

The decoding algorithms and procedures are defined in the ISO/IEC 11172 standard in greater detail. As a result, the basic structure of a decoder is also defined.

The decoding procedure comprises three functional units:

Synchronization of the frames and decoding of the page information (Frame Unpacking)

Inverse quantization and resealing (Reconstruction)

Transformation in time domain and windowing (Inverse Mapping)

The decoder first synchronizes itself to the block structure of the bit stream and disassembles the stream into additional information and quantizised spectral data. These are the basics for a subsequent reconstruction of the spectrum. Finally, an inverse filter bank transforms the spectral data samples into the time domain again.

However, the processing method is very expensive, especially because of the described filter algorithm. The processes for the basic functions can't be processed in parallel without further hardware expenditure for the processing units.

Using the MASC 3500 chip of Intermetall, an audio decoder can be constructed for layers 1 to 3. Its function is described in "Single Chip Implementation of an ISO/MPEG Layer III Decoder", in AES, 26.2.–1.3.1994, Amsterdam. It deals with a programmable DSP comprising an arithmetic unit, two parallel memory blocks having corresponding address generators, and a control unit. The capacity of use of the arithmetical unit will be optimized using a so-called "Harvard architecture", where command data and audio data are transmitted with separate data paths. The arithmetic unit comprises a multiplier/accumulator (MAC) and an arithmetic logic unit (ALU). The decoder offers the advantage being flexible because of it's programmability. However, the high input power is high compared to user oriented circuits and a large chip area is necessary. As a result, common integration of the circuit with further functional units, such as a video decoder, isn't possible. Also the circuit offers no possibility for having parallel processes to increase the throughput rate and minimize the clock frequency so as to decrease the input power.

The same disadvantages also occur in the CS4920 decoder described in the data handbook "Multi Standard Audio Decoder DAC" by CRYSTAL Semiconductor Corporation. It is also based upon a digital signal processor (DSP).

A L 64111 decoder unit by LSI-Logic for layers 1 and 2 comprises four components: a preparser, a decoder, a DRAM-Controller, and a PCM interface. It requires an external DRAM. The manner of operation is described in ELRAD, volume 1, 1994, page 66. The preparser sorts the audio data out of the MPEG system stream, synchronizes the system and audio data streams, and removes the parametrical header and the time information. The decoder unpacks the audio data and performs inverse quantization, scaling, and filtering. The decoding process is started with a start command produced by the microprocessor or transmitted via an external start input. The decoder reads the parameter and the information out of the external DRAM, whereas the DRAM-controller is coordinating the process of writing of the parser and the process of reading of the decoder. The processes of inverse quantization, scaling, transformation into the time domain, as well as windowing are run serially one after another under the control of a program.

A multiplier/accumulator unit is integrated into the decoder logic and performs the necessary calculations.

Disadvantageously, this audio decoder can not perform decoding processes in parallel so that resources are not used in an optimum way. Moreover, for controlling the processes, an external microcontroller is necessary. Furthermore, data samples are usually stored relative to their group using a linear logical address. But, the memory access to the audio data differs according to the various processes so that memory areas can't be overwritten. For this, a shared memory can't be utilized in an optimized way, especially with hard wired data processing units.

SUMMARY OF THE INVENTION

An object of the invention is to provide a method and an apparatus for decoding of digital audio data encoded in accordance with layer 1 or 2 of the MPEG format. The method and the apparatus should be designed in such a way that it can be integrated with as small a chip area as possible. In combining other functions, such as video decoding, the apparatus should have an input power as low as possible to minimize the necessary clock rate. The solution should not be based on a digital signal processor (DSP). Rather, the resources should be used in an optimum way. Specifically, the hardware expenditure of the processing units should be minimized and the memory should be utilized in an optimized way.

The object is solved by the invention described herein. An essential advantage of the invention is the optimized use of the multiplier of the processing unit. The common use of the processing unit is facilitated by dividing the processes between different units and processing them in a time multiplexed operation. The processes can be performed in parallel because they cooperatively regulate the access to the multiplier so as to dissolve access conflicts. Thereby, inverse quantization, resealing and windowing can be performed in parallel. When the process of transforming the rescaled sample data using a matrix calculation begins, decoding of the header and synchronization of a frame is completed.

By providing the frame unpacking and filter bank units with respective local memories, individual processes can be processed in parallel with each other. The local memories store fixed values for standardized coefficients. But, the frame unpacking and filter bank units are able to commonly read and write the shared memory so that the filter bank unit is placed at the rescaled audio decoders's disposal. Because the following matrix calculation causes the multiplier to be fully working to capacity anyway, the resealing is not performed in parallel. There is no need for the frame unpacking unit to access the shared memory in this period so that no conflict arises. By performing the processes independently from each other using the frame unpacking and filter bank units, there is the advantage that simple start signals from a system control unit will coordinate carrying out the processes in a time optimized way without having a large hardware expenditure for control elements.

A further optimization of the decoder can be achieved by reduction of the required operations for the filtering process.

For this the standardized algorithm of the filter is transformed. By doing this, the processing effort decreases by one half.

A very advantageous design of the decoder can be achieved by having the linear logical address space accessed by the individual processes transformed to a physical address space of the shared memory. For this, a plurality of address map modes are defined that release memory areas depending on the processes being carried out and carry out the memory allocation. Data which is no longer needed can be overwritten nearly immediately so that the memory is used in an optimum way. The control of the address map modes is performed by the system control unit.

By realizing the apparatus with these essential features, only a small chip area is necessary in contrast to solutions with programmable digital signal processors. The continuous use of the processing unit leads to a very low clock rate and therefore a very low input power for the apparatus. This way it is possible, in connection with a circuit for decoding of video signals, to integrate a complete solution onto one circuit board.

BRIEF DESCRIPTION OF THE DRAWINGS

Using the following drawings the invention will be described. These drawings include:

FIG. 1: A block diagram of an audio decoder having frame unpacking and filter bank units and a common processing unit;

FIG. 2: A timing diagram connecting the processes of layer 1;

FIG. 3: A timing diagram connecting a timing diagram connecting the processes of layer 2;

FIG. 4: The first part of a flow chart of the process controlled by a control unit of the audio decoder;

FIG. 5: The second part of the flow chart of FIG. 4;

FIG. 6: A flow chart of the process control for decoding page information using the frame unpacking unit;

FIG. 7: A flow chart of the process "Wait for Sync-word" used for decoding the page information using the frame unpacking unit;

FIG. 8: A flow chart for decoding the header using the frame unpacking unit;

FIG. 9: A flow chart for selecting localization of the audio data in the data stream;

FIG. 10: A flow chart for selecting the SCFSI information of layer 2;

FIG. 11: A flow chart for selecting the scale factors;

FIG. 12: A flow chart of the process "Sample-Reconstruction";

FIG. 13: A flow chart of preprocessing the process "Sample-Reconstruction";

FIG. 14: A flow chart of re-grouping the data streams for preprocessing;

FIG. 15: A flow chart for reconstruction of the samples;

FIG. 16: A flow chart of process control for the matrix operation using the filter bank unit;

FIG. 17: A flow chart of processing addresses of the matrix coefficients stored in the ROM using the filter bank unit;

FIG. 18: A flow chart of the process control for windowing using the filter bank unit;

FIG. 19: A flow chart of processing a new address for data stored in the RAM for windowing;

FIG. 20: A flow chart of the address initialization for data stored in the RAM for windowing;

FIG. 21: A diagram of the order of the shared memory accesses;

FIG. 22: A diagram of the logical division of the shared memory.

DETAILED DESCRIPTION OF PREFERRED EMBODIMENTS

The audio decoder shown in FIG. 1 comprises four blocks: a frame unpacking unit 2, a filter bank unit 3, a processing unit 1, and a system control unit 5. And, two FIFO memories 6 and 7 are used for handling input and output data. The data stream is read in using the input FIFO memory 6. In the frame unpacking unit 2, synchronization, evaluation of the header and decoding of page information takes place. Also, the frame unpacking unit 2 is responsible for the reconstruction of the quantizised and scaled samples. The reconstructed samples are transformed into the time domain, windowed and transfered to the output FIFO memory 7 afterwards using the filter bank unit 3. In order to save chip area, the frame unpacking and filter bank units 2 and 3 use common resources. The multiplications and additions are all processed in the processing unit 1 with only one multiplier/accumulator unit (MAC). The data transfer between the frame unpacking and filter bank units 2 and 3 takes place via a commonly used shared memory 4. Achieving a more efficient use of the common resources, they perform processes in a time multiplexed operation so that the processes are tightly interlocked with each other. Control of the processes is performed by the system control unit 5.

The processing unit 1 comprises a multiplier/accumulator unit (MAC) 12 having two inputs and one output. Using a control vector, it can be determined whether the results of a multiplication shall be summed by the accumulator of the MAC 12. The result of the multiplication and the content of the accumulator can both be connected to the inputs.

Processing of the data is granule oriented. A granule-buffer memory 8 is able to store a complete granule.

Decoding of the data stream can be performed with the five processes "Page info", "Sample reconstruction", "Calculation of matrix", "Windowing" and "Output". These processes are tightly interlocked with each other resulting in an efficient utilization of the common resources. As shown in table 3, the processes accesses corresponding common resources.

TABLE 3

Processes and the resources used thereof

| Process | Local memory 9 | Shared memory 4 | Local memory 10 | MAC 12 |
|---|---|---|---|---|
| Page info | writing | — | — | — |
| Sample Reconstruction | reading | writing | — | X |
| Matrix calculation | — | reading | writing | X |
| Windowing | — | writing | reading | X |
| Output | — | reading | — | — |

In FIGS. 2 and 3, the time interlocking of the processes for layers 1 and 2 is shown. The matrix operation runs without parallel processes. Reconstruction of the samples can be processed contemporaneously with the windowing process. The process of outputting the data takes place independently of the other processes, possibly under the control of an external signal. The process of matrix calculation is stopped in defined intervals and the output of the PCM coded audio data is performed at the desired rate without delay.

The order of the processes are described in the flow diagrams of FIGS. 4 to 20. They can be realized as hardwired units having gate arrays or programmed units by using common design tools. In the invention, the processes shown in FIGS. 4 to 15 are realized in the frame unpacking unit 2. A flow is shown in FIGS. 16 to 20 for the matrix calculation and windowing processes with a hardware solution implemented in the filter bank unit 3.

1. Activation of the processes

Synchronization of the processes takes place cooperatively via the individual processes. The order of the activations of the processes will be determined by the system control unit 5. The system control unit 5 can be realized as a programmable unit or a hard wired logic circuit. The flow for decoding the audio data is shown in the flow diagram of FIG. 4. An essential functional feature of the system control unit 5 is the generation of start signals for starting the individual processes. The end of the processes will be signaled to the system control unit 5 by the frame unpacking and filter bank units 2 and 3.

For activation of a process using a start signal, the corresponding signal will be set to the value '1' for one clock cycle. Afterwards, the active process blocks all of the other processes from accessing common ressources using a RDY signal with the value '0'. If the active process ends at a location where the process can be interrupted or arrives at this location, the process signals this state by switching the value of the RDY signal '1'. The system control unit 5 afterwards defines the process to be activated next. An exception is the output process which may be controlled by an external clock that is continuously active.

2. The process "side info"

In the process "side info", shown in deteiles in FIG. 6, synchronization of the frame, decoding of the header and reading the page information out of the data stream is carried out. Thereby, a complete bit allocation table and an index table of the scale factors are constructed and stored in local memory 9 of the frame unpacking unit 2. This process will be started once at the beginning of each of frame and does not accesses to common resources.

In the following discussion, the essential functional features of the process "page info" are described. First, the synchronization data will be searched, as described in FIG. 7, by bitwise checking of the data stream. Afterwards, the header and the CRC data word is read and the validity thereof is checked. This process is described in FIG. 8. Therefore, 4 bits of the data stream are loaded into the header register, the CRC register is reset and the CRC control is switched on. Then 16 bits are written into the header register. If the header is invalid, the next synchronization data word is searched. The length of the following audio data will be checked in the process "bit allocation", as described in FIG. 9, and is written into the local memory 9 of the frame unpacking unit 2

If the data stream is transmitted in the layer 2 format, the SCFSI information is read and intermediately stored into the local memory 9 of the frame unpacking unit 2. The handling of how to read the SCFI information is described in FIG. 10. Afterwards, the scale factors are read and stored into the local memory 9 of the frame unpacking unit 2. This process is described in FIG. 11.

3. The process "Sample Reconstruction"

In the process "Sample Reconstruction", described in FIGS. 12 to 15, the samples of the bit stream are inverse quantizised and rescaled. In doing this, the frequency domain samples of a granule are read out of the data stream and inverse quantizised afterwards. In doing this, two multiplications are required whose results are summed using the accumulator. This provisional result will be sent to the input and will be multiplied with the scale factor. Altogether, three multiplications are necessary per sample. This calculation can be time multiplexed together with the windowing process. For making accesses to the commonly used processing unit 1 (i.e., MAC 12) possible for each of the processes, the processes can be stopped at defined times and later started again. The process "sample reconstruction" should be interrupted every 32*N ( N=number of channels) data samples for layer 1 and every 24*N (N=number of channels) data samples for layer 2 to prevent overwriting data in said granule buffer memory 8 that is still required by the process "matrix calculation".

Essential functional elements of this process are preprocessing together with degrouping and control of the processing unit 1 for processing the actual reconstruction. In the preprocessing process, the data are read out of the stream and are directly written into the FIFO output memory 7. If the data are grouped, a degrouping will be processed. In doing this, the data are written block wise into the FIFO output memory 7 using three stages at maximum. Reconstruction is taken place in such a manner that there is a reset of the processing unit 1. After that, the data samples are multiplied by the coefficients for inverse quantization. The results of the inverse quantization will be multiplied by the scale factors afterwards. Then, the reconstructed data samples are written into the granule buffer memory 8 of the common shared memory 4.

4. The process "matrix calculation"

In the process "matrix calculation", described in FIG. 16, the transformation of the data in the frequency domain into data in the time domain takes place using a matrix operation. In doing this, the data of a 32-data-width vector, which corresponds to the number of subbands, is read out of the granule buffer memory 8 in turns, filtered and written into the local memory 10 of the filter bank unit 3. In this case, the coefficients for the matrix calculation are stored in a ROM. This procedure has the advantage that the memory effort will be reduced. The coefficients are read by calculating ROM address using the procedure shown in FIG. 17. For two channels, the process requires 32*32*2 multiplications. The process "matrix calculation" will not be interrupted so that during this time the processes "Windowing" and "Sample Reconstruction" are blocked.

5. The process "Windowing"

In this process, the data in the time domain are windowed sing the local memory 10 of the filter bank unit 3 to receive the PCM audio data to be outputted. The decoded audio data are written into the output FIFO memory 7 and outputted using the process "Output". This procedure is shown in FIG. 18.

The data in the time domain are read out of the local memory 10 of the filter bank unit 3 and together with the respective coefficients of a local ROM memory are provided to the processing unit 1. In the processing unit 1, the multiplications and accumulations will be performed. Because the coefficients for windowing have symmetrical characteristics, only half of them are stored. The access to the RAM addresses of the local memory 10 is controlled by the procedure "Calculate new RAM offset". This process is described in FIG. 19. After each set of 16 PCM data samples of the lower and upper storage area are processed, the result will be written into the output FIFO memory 7. Afterwards, the procedure is stopped. By doing so, it will be guaranteed that the process "Output" is able to access the output FIFO memory 7 a sufficient number of times so that no data samples are overwritten that have not been outputted already. The actual memory addresses of the input data samples in the second local memory 10 are calculated using the procedure "Initialize RAM-address", as described in FIG. 20.

6. The process "Output"

The process "Output" is used] to output the PCM audio data (e.g. to a DAC, hard disk, etc.) from the output FIFO memory 7. The output clock rate will be defined by an external clock signal (e.g. sample rate or bus clock).

7. The addressing of the shared memory 4 The addressing of the common shared memory 4 is not done directly by the processes that access the memory. Instead, an address mapping device 11 is used. That way, an optimized utilization of the granule buffer 8 can be achieved so that emory locations that become available can be overwritten immediately. The control of the address mapping device 11 is undertaken by setting a map mode with the system control unit 5. The map mode defines where in the shared memory 4 the samples are stored. Through the postponement in time of the processes that access the shared memory 4, the map mode is changed at different moments.

Based upon the different processing sequences of the reconstruction and matrix operation processes, the following problem arises for layer 2:

After a matrix operation, 32 memory locations are available. These locations can't be accessed with linear addressing of the memory for storing the following granule. This is because the reconstruction process takes place in groups of three in layer 2. The problem is described in FIG. 21. In the linear address space on the left side, the order of the reconstructed samples in the frequency domain are shown. In the reconstruction process, at first the 0th, 32th and 64th data samples are stored and afterwards the 1th, 33th and 65th data, etc. are stored. Thereby, the data are divided in groups of three. In the matrix operation process, however, these groups are processed one after another, as shown in the linear address space on the right side of FIG. 21.

Thus, one aspect of the invention is to transform the linear logical address space of the individual processes to a physical address space of the shared memory 4 with the help of a transformation function. This transformation function is not static and dynamically depends on the state of the decoder. Thereby, the logical division of the memory is chosen in such a way that the 8 bit wide address is divided into three areas, as shown in FIG. 22.

The bit 7 divides a 256 data sized memory into one area per channel. The bits 1 and 0 divide each of the two areas into four groups, where the following assignment is valid:

TABLE 4

Coordination of Logical Addresses

| Bit 1 | Bit 0 | Assignment |
|---|---|---|
| 0 | 0 | Group 0 Granule |
| 0 | 1 | Group 1 Granule |
| 1 | 0 | Group 2 Granule |
| 1 | 1 | Output FIFO (1 channel) |

Within each of these four groups, the bits 6 to 2 provide an index that indicate the offset within a group (i.e., the subband). Recalculation of the address of the logical address space into an address of the physical address space of the existing memory 4 takes place within the address mapper 11 using the following transformation function:

Adr_phy=Adr_log [7], (Adr_log [6 . . . 0] rotate left (J*2)
with: J=0 . . . 6;
Adr_phy=physical address;
Adr_log=logical address.

TABLE 5

Connection between Logical address and Physical address

| Mode j | logical address | physical address |
|---|---|---|
| 0 | A7;A6;A5;A4;A3;A2;A1;A0 | A7;A6;A5;A4;A3;A2;A1;A0 |
| 1 | A7;A6;A5;A4;A3;A2;A1;A0 | A7;A4;A3;A2;A1;A0;A6;A5 |
| 2 | A7;A6;A5.A4.A3.A2;A1;A0 | A7;A2;A1;A0;A6;A5;A4;A3 |
| 3 | A7;A6;A5;A4;A3;A2;A1;A0 | A7;A0;A6;A5;A4;A3;A2;A1 |
| 4 | A7;A6;A5;A4;A3;A2;A1;A0 | A7;A5;A4;A3;A2;A1;A0;A6; |
| 5 | A7;A6;A5;A4;A3;A2;A1;A0 | A7;A3;A2;A1;A0;A6;A5;A4 |
| 6 | A7;A6;A5;A4;A3;A2;A1;A0 | A7;A1;A0;A6;A5;A4;A3;A2 |
| 7 = 0 | A7;A6;A5;A4;A3;A2;A1;A0 | A7;A6;A5;A4;A3;A2;A1;A0 |

In table 5, the connection between a logical address and a physical address is clearly shown. After sequential passing through the seven modes, the original mode will be reached. The parameter J of the transformation function represents the addressing mode being set by the system control unit 5 depending on the state of the decoder. The addressing mode will be set to value 0 while initializing the decoder and will be incremented after processing of a granule. To accomplish this, a modulo-seven counter is used. Because the various processes finish processing of a granule at different times, the addressing modes of the processes may temporarily be different. Using this process control, it can be guaranteed that two processes never write the same memory locations.

With this kind of addressing, the memory locations are already available for the reconstruction process even before finishing the matrix operation process for a granule. Thus, parallel running of the processes is possible.

The transformation function can be easily implemented in hardware by a group of 7×1 multiplexers. This method of addressing results in 24 of the 32 memory locations becoming available for the reconstruction process after the first of the three matrix operations for a granule. Also, after the second matrix operation, 24 memory locations are available for the reconstruction process. After the third matrix operation, i.e., after termination of the matrix operations for a granule in layer 2, the remaining 48 memory locations are available for the reconstruction process.

We claim:

1. An apparatus for decoding digital audio data that is encoded according to the MPEG layer 1 or 2 format and received in an input data stream, the digital audio data comprising frames, each of the frames comprising a synchronization word, a header, page information, and data samples in the frequency domain, the apparatus comprising:

a shared processing unit;

a shared memory;

frame unpacking unit that;

(a) performs a synchronization process by locating the synchronization word of a specific frame of the frames in the input data stream;

(b) performs a decoding process by (i) reading the header of the specific frame out from the input data stream, and (ii) decoding the read out header to check the validity of the specific frame;

(c) comprises a local memory, (d) performs a reading process by (i) reading the page information of the specific frame out from the input data stream, and (ii) storing the read out page information in the frame unpacking unit's local memory;

(e) performs a reconstruction process by (i) reading the data samples of the specific frame out from the input data stream, (ii) using the processing unit to inverse quantize and rescale the read out data samples according to the stored page information, and (iii) accessing the shared memory to store the inverse quantized and rescaled data samples in the shared memory;

a filter bank unit that:
  (a) comprises a local memory,
  (b) performs a transformation process by (i) accessing the shared memory to read out the inverse quantized and rescaled data samples from the shared memory, (ii) using the shared processing unit to perform a matrix calculation such that the read out inverse quantized and rescaled data samples are transformed from the frequency domain to the time domain, and (iii) storing the transformed data samples in the filter bank unit's local memory; and
  (c) performs a windowing process by (i) reading the transformed data samples out from the filter bank unit's local memory, (ii), using the shared processing unit to window the read out transformed data samples, and (iii) accessing the shared-memory to store the windowed data samples in the shared memory;

a control unit that (a) performs an output process by accessing the shared memory to read the windowed data samples out from the shared memory in an output data stream, and (b) controls the shared processing unit, the frame unpacking unit, and the filter bank unit so that performance of the reconstruction, transformation, windowing, and output processes is interlocked and time multiplexed with the reconstruction and windowing processes being performed in parallel with each other but in serial with the transformation process.

2. A method of decoding digital audio data that is encoded according to the MPEG layer 1 or 2 format and received in an input data stream, the digital audio data comprising frames, each of the frames comprising a synchronization word, a header, page information, and data samples in the frequency domain, the method comprising the steps of:

performing a synchronization process by locating the synchronization word of a specific frame of the frames in the input data stream;

performing a decoding process by (i) reading the header of the specific frame out from the input data stream, and (ii) decoding the read out header to check the validity of the specific frame;

performing a reading process by (i) reading the page information of the specific frame out from the input data stream, and (ii) storing the read out page information in a first local memory;

performing a reconstruction process by (i) reading the data samples of the specific frame out from the input data stream, (ii) using the processing unit to inverse quantize and rescale the read out data samples according to the stored page information, and (iii) accessing the shared memory to store the inverse quantized and rescaled data samples in the shared memory;

performing a transformation process by (i) accessing the shared memory to read out the inverse quantized and rescaled data samples from the shared memory, (ii) using the shared processing unit to perform a matrix calculation such that the read out inverse quantized and rescaled data samples are transformed from the frequency domain to the time domain, and (iii) storing the transformed data samples in a second local memory;

performing a windowing process by (i) reading out the transformed data samples from the filter bank unit's local memory, (ii), using the shared processing unit to window the read out transformed data samples, and (iii) accessing the shared memory to store the windowed data samples in the shared memory;

performing an output process by accessing the shared memory to read the windowed data samples out from the shared memory in an output data stream;

controlling performance of the reconstruction, transformation, windowing, and output processes so that performance of the reconstruction, transformation, windowing, and output processes is interlocked and time multiplexed with the reconstruction and windowing processes being performed in parallel with each other but in serial with the transformation process.

3. An apparatus as claimed in claim 1 wherein:
the control unit issues start signals to start the reconstruction, transformation, and windowing processes; and
the frame unpacking unit and the filter bank unit issue ready signals to interrupt the reconstruction, transformation, and windowing processes so that performance of the reconstruction, transformation, and windowing processes is interlocked and time multiplexed with the reconstruction and windowing processes being performed in parallel with each other but in serial with the transformation process.

4. An apparatus as claimed in claim 3 wherein:
for MPEG layer 1, the frame unpacking unit interrupts the reconstruction process every 32×N data samples by issuing one of the ready signals;
for MPEG layer 2, the frame unpacking unit interrupts the reconstruction process every 24×N data samples by issuing one of the ready signals; and
where N is the number of channels in the input data stream.

5. An apparatus as claimed in claim 1 further comprising:
an address mapping device that is controlled by the control unit to select a current map mode from among multiple map modes, each of the map modes providing a corresponding mapping of logical addresses to physical addresses;
for MPEG layer 2, the rescaled and inverse quantized data samples are stored in the shared memory in the reconstruction process in a different order than read out from the shared memory in the transformation process such that there is (a) a corresponding linear logical address space in the shared memory for the reconstruction process, (b) a corresponding linear logical address space in the shared memory for the transformation process, and (c) a corresponding linear logical address space in the shared memory for the windowing and output processes;
in the reconstruction process for MPEG layer 2, the frame unpacking unit issues logical addresses in the corresponding linear logical address space to access the shared memory;
in each of the transformation and windowing processes for MPEG layer 2, the filter bank unit issues logical addresses in the corresponding linear logical address space to access the shared memory;
in the output processes for MPEG layer 2, the control unit issues logical addresses in the corresponding linear logical address space to access the shared memory;

in each of the reconstruction, transformation, windowing, and output processes for MPEG layer 2, the address mapping device maps the issued logical addresses to corresponding physical addresses of the shared memory according to the current map mode to access the shared memory with the corresponding physical addresses;

for MPEG layer 2, the control unit controls the address mapping device in changing the current map mode so that (a) the rescaled and inverse quantized data samples that are read out from the shared memory in the transformation process are overwritten by the rescaled and inverse quantized data samples that are being stored in the shared memory in the reconstruction process, (b) the windowed data samples that are outputted in the output process are overwritten by the windowed data samples that are being stored in the shared memory in the windowing process, and (c) none of the rescaled and inverse quantized data samples that have not yet been transformed in the transformation process and none of the windowed data samples that have not yet been outputted in the output process are overwritten.

6. An apparatus as claimed in claim 5 wherein:

one of the multiple map modes includes a specific map mode to map logical addresses to equivalent physical addresses; and for MPEG layer 1, the control unit controls the address mapping device in keeping the current map mode as the specific map mode for each of the reconstruction, transformation, windowing, and output processes.

7. A method as claimed in claim 2 further comprising the steps of:

issuing start signals to start the reconstruction, transformation, and windowing processes; and issuing ready signals to interrupt the reconstruction, transformation, and windowing processes so that performance of the reconstruction, transformation, and windowing processes is interlocked and time multiplexed with the reconstruction and windowing processes being performed in parallel with each other but in serial with the transformation process.

8. A method as claimed in claim 7 wherein:

for MPEG layer 1, the reconstruction process is interrupted every 32×N data when one of the ready signals is issued;

for MPEG layer 2, the reconstruction process is interrupted every 24×N data samples when one of the ready signals is issued; and where N is the number of channels in the input data stream.

9. A method as claimed in claim 2 further comprising the steps of:

selecting a current map mode from among multiple map modes, each of the map modes providing a corresponding mapping of logical addresses to physical addresses;

for MPEG layer 2, the rescaled and inverse quantized data samples are stored in the shared memory in the reconstruction process in a different order than read out from the shared memory in the transformation process such that there is (a) a corresponding linear logical address space in the shared memory for the reconstruction process, (b) a corresponding linear logical address space in the shared memory for the transformation process, and (c) a corresponding linear logical address space in the shared memory for the windowing and output processes;

in each of the reconstruction, transformation, windowing, and output processes for MPEG layer 2, issuing logical addresses in the corresponding linear address space to access the shared memory;

in each of the reconstruction, transformation, windowing, and output processes for MPEG layer 2, mapping the issued logical addresses to corresponding physical addresses of the shared memory according to the current map mode to access the shared memory with the corresponding physical addresses;

for MPEG layer 2, controlling changing of the current map mode so that (a) the rescaled and inverse quantized data samples that are read out from the shared memory in the transformation process are overwritten by the rescaled and inverse quantized data samples that are being stored in the shared memory in the reconstruction process, (b) the windowed data samples that are outputted in the output process are overwritten by the windowed data samples that are being stored in the shared memory in the windowing process, and (c) none of the rescaled and inverse quantized data samples that have not yet been transformed in the transformation process and none of the windowed data samples that have not yet been outputted in the output process are overwritten.

10. A method as claimed in claim 9 wherein:

one of the multiple map modes includes a specific map mode to map logical addresses to equivalent physical addresses; and for MPEG layer 1, the method further comprises the step of keeping the current map mode as the specific map mode for each of the reconstruction, transformation, windowing, and output processes.

* * * * *